United States Patent [19]

Fabian

[11] Patent Number: 4,698,196

[45] Date of Patent: Oct. 6, 1987

[54] METHOD AND APPARATUS FOR EXTRUDING CREASELESS THIN WALLED TUBES

[75] Inventor: Ellis Fabian, N. York, Canada

[73] Assignee: Xerox Corporation, Stamford, Conn.

[21] Appl. No.: 813,291

[22] Filed: Dec. 24, 1985

[51] Int. Cl.⁴ ............................................. B29D 23/22
[52] U.S. Cl. ........................................ 264/565; 83/37;
  83/54; 83/100; 264/101; 264/150; 264/151;
  264/159; 264/209.5; 264/568; 425/296;
  425/326.1
[58] Field of Search ............ 264/564, 568, 150, 209.5,
  264/101, 565; 425/72 R, 326.1, 296; 83/37, 54,
  100, 22

[56] References Cited

U.S. PATENT DOCUMENTS

| | | |
|---|---|---|
| 2,519,375 | 2/1946 | Jargstorff et al. |
| 2,966,700 | 1/1961 | Dyer et al. |
| 2,994,923 | 8/1961 | Eddy .................................. 264/563 |
| 3,085,290 | 12/1959 | Chu . |
| 3,171,696 | 7/1961 | Houghton ............................... 308/1 |
| 3,246,055 | 4/1966 | Pendleton ............................ 264/23 |
| 3,300,555 | 1/1967 | Bild et al. ......................... 264/209.5 |
| 3,376,181 | 4/1968 | Larson et al. ....................... 264/150 |
| 3,447,480 | 5/1965 | Brodine, Jr. ........................... 164/49 |
| 3,553,303 | 1/1971 | Zavasnik ............................ 264/150 |
| 3,576,051 | 4/1971 | Click .................................. 264/564 |
| 3,577,488 | 5/1971 | Bigland . |
| 3,671,617 | 6/1972 | Nagase ................................ 264/89 |
| 3,725,519 | 4/1973 | Seifried et al. ....................... 264/25 |
| 3,742,105 | 6/1973 | Kuroda ............................... 264/89 |
| 3,775,523 | 11/1973 | Haley ................................. 264/89 |
| 3,819,790 | 12/1969 | North et al. .......................... 264/89 |
| 3,835,209 | 9/1974 | Karabedian .......................... 264/51 |
| 3,891,374 | 6/1975 | Ninomiya et al. .................... 425/326 |
| 3,944,641 | 3/1976 | Lemelson ............................. 264/70 |
| 4,062,916 | 12/1977 | Skilling .............................. 264/95 |
| 4,118,453 | 10/1978 | Herrington .......................... 264/89 |
| 4,270,891 | 6/1981 | Hopper .............................. 425/296 |
| 4,341,729 | 7/1982 | Hayashi et al. .................... 264/566 |
| 4,494,433 | 1/1985 | Gerber ............................... 83/100 |
| 4,536,365 | 8/1985 | Zwich ............................... 264/564 |

FOREIGN PATENT DOCUMENTS

| | | |
|---|---|---|
| 153610 | 5/1952 | Australia . |
| 711163 | 6/1965 | Canada ............................... 264/564 |
| 2232776 | 1/1974 | Fed. Rep. of Germany . |
| 71169 | 6/1978 | Japan . |
| 7705659 | 7/1978 | Netherlands ........................... 83/54 |
| 823228 | 11/1959 | United Kingdom .................. 83/100 |

OTHER PUBLICATIONS

Japanese Patent Document 1981-46,729, Showa Denko, K.K., published 04/28/81.
Plastics Extrusion Technology & Theory, G. Schenkel.

*Primary Examiner*—James Lowe
*Attorney, Agent, or Firm*—Peter H. Kondo

[57] ABSTRACT

Apparatus for preparing seamless, creaseless, pliable, thin-walled tubes comprising means to extrude a moving continuous tube of polymeric film material from a die, means to radially stretch the continuous tube as it emerges from the die, means to longitudinally stretch the tube, and means to sever the tube while the tube is in motion to form tube segments while maintaining the tube substantially free of creases. This apparatus may be employed in a process to prepare seamless, creaseless, pliable, thin-walled tubes.

13 Claims, 26 Drawing Figures

METHOD AND APPARATUS FOR EXTRUDING CREASELESS THIN WALLED TUBES

This invention relates in general to pliable seamless tubes and, more specifically, to novel apparatus and processes for making the tubes.

In the art of extruding thin-walled, large diameter polymer tubes from an annular orifice, air is introduced into the hot tubing as its emerges from the extruder to prevent collapse of the tubing walls while the thermoplastic material is cooling and solidifying. The molten polymer tube, if unsupported, tends to sag and deform under its own weight with bonding occurring at any point of contact with itself or with adjacent surfaces of the extrusion apparatus. in the blown film extrusion technique, the tube is also expanded by the internal air pressure. The formed tubing is thereafter recovered by passing it between pinch rollers which flatten the tubing. The flattened tubing may subsequently be transported to a suitable device for rolling the flattened tubing for further processing in a device such as a bag making machine.

Although thermoplastic film tubing has been manufactured commercially, difficulties have been experienced in preparing thin-walled, large-diameter, pliable tubes having precise dimensional uniformity in wall thickness, tube ·diameter and conicity which would satisfy high tolerance requirements. Techniques for forming thermoplastic tubes for garbage bags such as by blown extrusion are generally inadequate for devices that must meet high dimensional standards. For example, electrostatographic members such as photoreceptor substrates for use in sophisticated high speed electrophotographic copiers, duplicators and printers must have a uniform thickness and diameter so that the photoconductive layers thereon are maintained at precise distances from optical exposure devices, charging devices, cleaning devices and image transfer stations. Thus, these distances must be uniform across the width and along the circumference of the photoreceptor belt and be free of any imperfections such as seams and creases.

Generally, photoreceptor belts in cylindrical form are prepared by overlapping the opposite ends of a sheet of photoreceptor material to form a cylindrical shape and then welding or otherwise joining the overlapping edges thereby creating a seam. Modern sophisticated electrophotographic imaging systems utilizing photoreceptor belts require photoreceptor belts in cylindrical form that are free of any seams for more efficient, extended life electrophotographic operation. When a developed electrostatic latent image is formed on a seam, the transferred toner image is deformed because of the non-uniform electrical properties of the seam and the uneven surface of the seamed section of the photoreceptor belt. In addition, the presence of seams prevents full utilization of the total photoreceptor such as the use of overlapping images around the entire periphery of the belt. Further, photoreceptor belts containing seams are more difficult to clean for recycling. Moreover, machine complexity, larger belts, imaging speed reduction, increased costs and other undesirable system characteristics are necessary to prevent the formation of images on the seam. Moreover, reproducibility of the diameter of a photoreceptor belt is necessary to insure proper fit on the belt support drive systems of modern electrophotographic copiers, duplicators and printers.

In the blown film extrusion process, the type of pinch rollers utilized to maintain the pressure of the internal air in the blown tube causes two diametrically opposite permanent creases to form in the tubing running parallel to the tube axis. These permanent creases render blown film extrusion belts unsuitable for modern high speed electrophotographic imaging systems because the creases interfere with charging, exposure, development, transfer and cleaning.

In order to avoid seams in a photoreceptor, one might extrude a photoreceptor material as a continuous thin-walled tube of the proper diameter and thereafter periodically cut the tube to obtain cylinders of a predetermined length. Unfortunately, undesirable creases may be formed from ones side of the tube to the other during the cutting operation which render the extruded cylinders unsuitable for many photoreceptor substrate uses. In addition, undesirable blemishes, irregular shapes or creases can occur during extrusion, expansion, stretching or other manipulative operations of the tube.

In U.S. Pat. No. 3,742,105, an apparatus is disclosed for producing a seamless creased tube. For example, the tubing 15 may be extruded by an extruder 10 through a die head 11, cooled by compressed air through radial nozzles 26 and 33 and flattened by rotary pull rolls 37 and 38.

In U.S. Pat. No. 4,270,891, an apparatus for cutting and taking off formed tubular plastic film is disclosed. For example, in FIG. 1, tubular film 9 is passed through a flattening plate 8 and severed into sheets by a cutting assembly 6 with blades 7. The cutting means disclosed in this patent cannot cut the extruded tube into right cylinders with ends in a plane normal to the longitudinal axis of the tube because the cutter cannot rotate at an infinite speed and extrudate's downstream velocity cannot be reduced to zero. Moreover, no means is disclosed to fully expand the tube to permit cutting from the outside or for continuously rotating the cutting head in a fixed angular direction.

In U.S. Pat. No. 3,775,523, an apparatus for making oriented tubular film is disclosed. For example, in FIG. 1, a molten polymer material 15 is extruded through an extrusion die 11 having an annular extrusion orifice 13, cooled in chamber 17, sized on sizing rings or discs 45-59, rolled through idler rolls 87, and longitudinaly stretched by nip roller s 21. A pressurized gas within the tubular film between the location of the extrusion and the location at which the successive oriented quenched portions of the tubular film are flattened. Further, the tubular film is drawn through a complex means comprising a plurality of controlled moving surfaces which grip the tube without flattening it and then creased down the line by nip rollers.

In U.S. Pat. No. 3,085,290, an apparatus is disclosed for making tubing of a maximum size of 4.39 inches and a wall thickness thinner than that required for self support. For example, in FIGS. 1 and 2, polymer material 22 is extruded by extruder 12 through a pair of telescoped pipes 10 and 11 of differing size diameters. The extrusion is stopped when the appropriate length has been extruded and the extruded tube is cut. In FIG. 3, the extruded tube 22 is oven baked to sinter the polymer paste and thereafter removed from the telescoped pipes 10 and 11.

In U.S. Pat. No. 3,085,290, a process for the continuous production of a multiaxially stretched tubular film is disclosed. The tube is extruded vertically downward into a calibrating core of a smaller diameter than the die while stretching the melt in a longitudinal direction, cooling the melt to form an unoriented tube which engages the core in a gas-tight manner, conveying the tube to a heat stretching zone, stretching the tube by increasing the speed of the tube and by increasing the pressure in the tube and cooling the tube. Draw-off rolls or belts having a width less than the width of the tube may be used, e.g. see FIGS. 1, 3, 3a, 4, and 4a.

Accordingly, there continues to be a need for an improved and more effective system for forming seamless, thin-walled, creaseless belts having wall thicknesses and tube diameters which satisfy high tolerance standards, particularly for tubes meeting the demanding dimensional uniformity requirements of modern, precision, high speed electrostatographic imaging systems.

SUMMARY OF THE INVENTION

It is an object of this invention to provide an extrusion system for forming seamless, creaseless, pliable, thin-walled tubes.

It is another object of this invention to provide an extrusion system for cutting continuously extruded, thin-walled, pliable tubes into fixed cylinders free of seams and creases.

It is another object of this invention to provide a more cost effective extrusion system The foregoing objects and others are accomplished in accordance with this invention by providing an apparatus for forming seamless, creaseless, pliable, thin-walled tubes comprising means to extrude a continuous tube of polymeric film material from a die, means to radially stretch the continuous tube as it emerges from the die, means to longitudinally stretch the tube and means to sever the tube to form tube segments while maintaining the tube substantially free of creases. A process for preparing the seamless, creaseless, pliable, thin-walled tubes is also contemplated comprising extruding a continuous moving tube of polymeric film material from a die, radially stretching the continuous tube as it emerges from the die, longitudinally stretching the tube, and severing the tube while maintaining the cross-sectional shape of the tube free of creases and while the tube is in motion thereby forming at least one tube segment having a right cylinder configuration substantially free of creases.

BRIEF DESCRIPTION OF THE DRAWINGS

The advantages of this improved apparatus and process will become more apparent upon a consideration of the following detailed disclosure of the invention, particularly when taken in conjunction with the accompanying figures wherein.

These figures merely schematically illustrate the invention and are not intended to indicate relative size and dimensions of actual extrusion systems or components thereof.

While the present invention will hereinafter be described in connection with the preferred embodiments and methods of use thereof, it will be understood that it is not intended to limit the invention to these embodiments and methods of use. On the contrary, it is intended to cover all alternatives, modifications and equivalents as may be included within the spirit and scope of the invention as defined in the appended claims.

For a general understanding of the features of the present invention, reference is made to the drawings.

Figure 1:
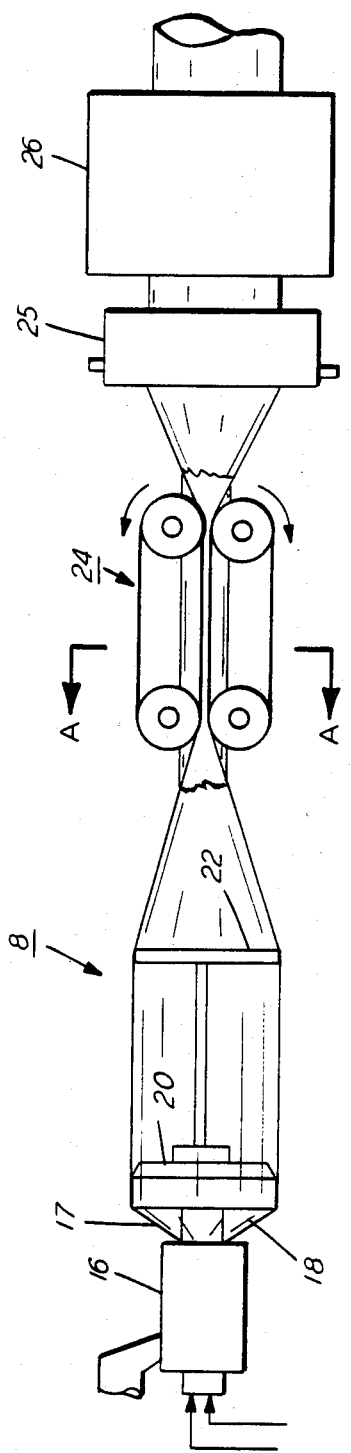
FIG. 1 is a schematic sectional view in elevation of a thermoplastic tube extrusion apparatus embodying features of the present invention.

A thin film extrusion apparatus 8 is illustrated in FIG. 1. Thermoplastic polymer pellets such as nylon 12, polyethylene terephthalate, polypropylene or the like, are fed by a conventional extruder (not shown), such as a single or multiple-screw extruder or other suitable device such as a melt pump (not shown), at a predetermined feed rate. If desired, the polymer pellets may be dried to remove any volatiles by predrying or by any suitable on-line device such as a desiccant hopper dryer. The polymer pellets are melted in the extruder and the molten polymer is pumped by the extruder through an annular thin-film extrusion die 10. The resulting extruded tubular film 17 is pulled through expansion zone 18, stretched over sizing disk 20, pulled over stabilizing disk 22 and pulled away from stabilizing disk 22 by tubular film puller 24, expanded to a cylindrical shape by an optional pressure/vacuum floatation ring 25 and cut by a cutter 26. The side of extruded tubular film 17 facing the viewer is not shown in order to more clearly illustrate the sizing disk 20, stabilizing disk 22 and tubular film puller 24.

Figure 2:
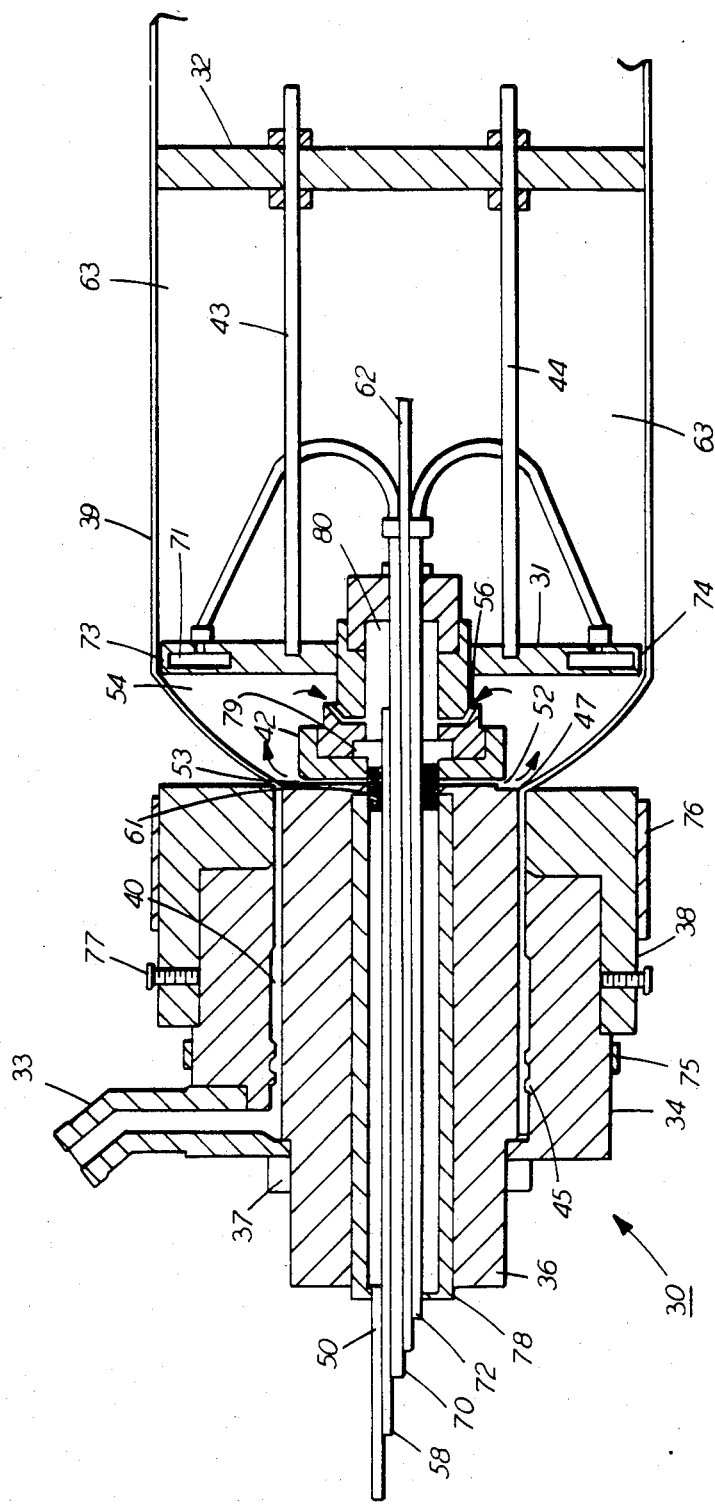
FIG. 2 is a schematic sectional view of one embodiment of an extrusion and shaping die assembly.

Referring to FIG. 2, a cross-head extrusion die 30 is illustrated which may be used as the extrusion die 16 of the extrusion system shown FIG. 1. This cross-head extrusion die 30 is coupled to a sizing disk 31 and stabilizing disk 32. The cross-head extrusion die 30 comprises a die adapter 33 coupled to an annular die body 34 which encircles a die mandrel 36. The die mandrel 36 is secured to the annular die body 34 by a lock nut 37 threaded on to die mandrel 36. Mounted to the annular die body 34 is an annular adjustable die face 38 which also encircles the die mandrel 36. The adjustable die face 38 allows adjustment of the die gap to compensate for film thickness variations around the circumference of the extruded tubular film 39. Annular die body 34 and annular adjustable die face 38 are spaced from die mandrel 36 and cooperate therewith to form an annular extrusion flow channel 40. A mandrel extension 42 couples sizing disk 31 to die mandrel 36. Support rods 43 and 44 secure stabilizing disk 32 to sizing disk 31. Although the illustration in FIG. 1 and other figures described hereinafter depict apparatus in which the extruded tubular film is extruded in a horizontal direction, other alignments such as extrusion in a vertical direction may be effected if desired.

Figure 3:
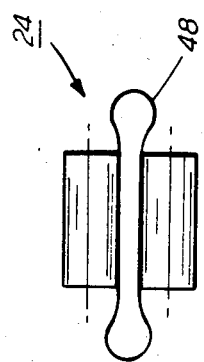
FIG. 3 is a sectional view along line AA of FIG. 1.

In operation, a molten thermoplastic material from an extruder, such as the extruder 12 shown in FIG. 1, is pumped into die adapter 33 of cross-head extrusion die 30, through annular extrusion flow channel 40 optionally containing choke ridges 45 (flow restrictors) and out die outlet 47 to form an extruded tubular film 39. The chock ridges 45 minimize the effect of weld line formation due to flow separation at the entrance to the annular extrusion flow channel 40. If desired, the choke ridges may be located on the die mandrel 36 as an alternative to or in addition to positioning of the choke ridges 45 on the inside annular surface of annular die body 34. Generally, the number, size and shape of any choke ridges employed should be selected so as to maintain the pressure within the extrusion die below the maximum pressure capacity of the extruder and extrusion die. Choke ridges are not normally employed for polymers that hang up and unduly thermally degrade. The extruder supplies the molten thermoplastic material to the cross-head extrusion die 30 under sufficient pressure to force the molten thermoplastic material through annular extrusion flow channel 40 and out the die outlet 47. Extruded tubular film 39 is pulled over sizing disk 31 and stabilizing disk 32 by a suitable tube puller, such as the tube puller 24 illustrated in FIGS. 1 and 3. In the sectional view shown in FIG. 3, the extruded tubular film 39 is contacted by the tube puller 24 in a flattened region extending longitudinal along the extruded tubular film 39 and segments 48 having a light bulb shaped cross section extend out from each side of tube puller 24. Since the segments 48 are not flattened, no creases are formed along the sides of extruded tubular film 39.

Figure 4:
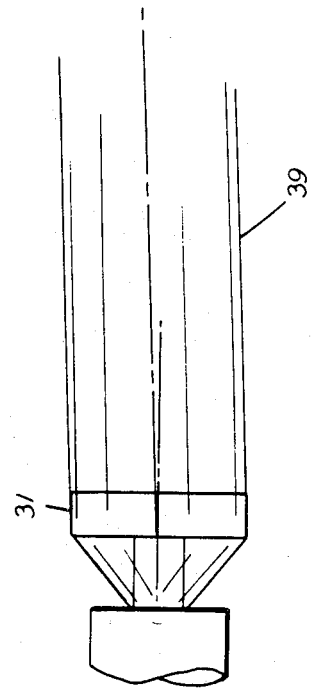
FIG. 4 is a schematic sectional view of an extrusion and shaping die assembly without a stabilizing disk.
Figure 5:
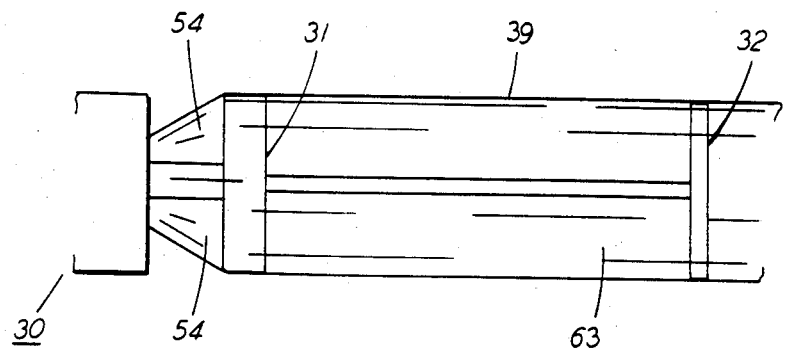
FIG. 5 is a schematic sectional view of an extrusion and shaping die assembly with a stabilizing disk.

Without downstream stabilization such as effected by stabilizing disk 32, it is possible for extruded tubular film 39 to not be coaxial with sizing disk 31 as shown in FIG. 4. If the axis of the extruded tubular film 39 moves during operation, the circumference of extruded tubular film 39 can change resulting in the final product having circumference variations along its axis which can easily exceed required tolerances for applications requring a high degree of precision. Even if tube segments have identical circumferences, their cross-sectional center points will not be colinear. Thus, a stabilizing disk 32 is preferred to maintain coaxial alignment between extruded tubular film 39 and sizing disk 31 as illustrated in FIG. 5. Further, the stabilizing disk prevents downstream disturbances (such as vibrations or cutting influences) from being felt upstream especially in the melt bubble in the expansion zone 54. Without a stabilizing disk vibrations or cuts downstream cause circumferential rings to form in the extruded tubular film 39 at the leading edge of the sizing disk 31.

Figure 6:
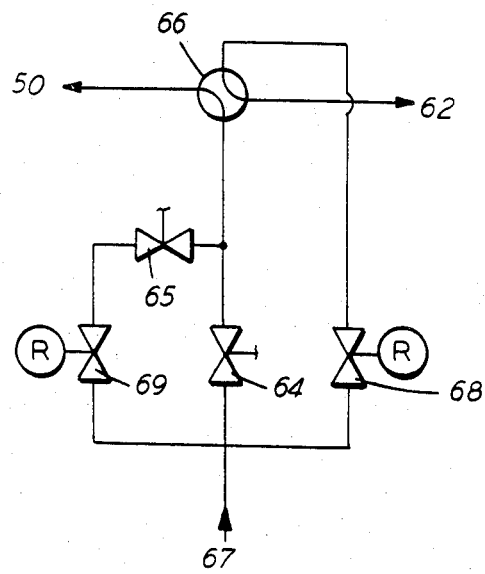
FIG. 6 is a schematic diagram of an air distribution system in one mode of operation for the extrusion system.
Figure 7:
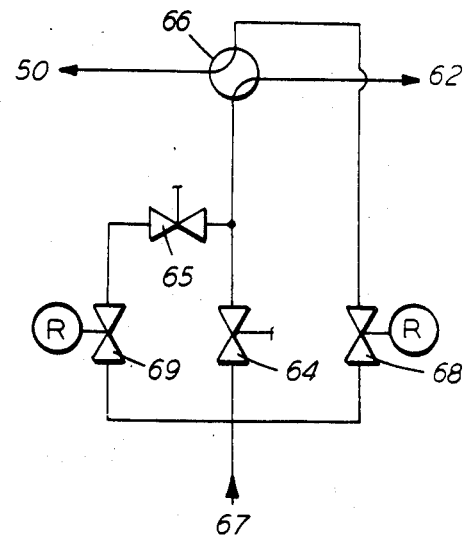
FIG. 7 is a schematic diagram of an air distribution system in another mode of operation for the extrusion system.

Referring again to FIG. 2, pressurized air or other suitable fluid is supplied through air line 50, into at least two air inlet channels 52, and through at least one recess 53 outwardly from the axis of the mandrel extension 42 to provide an air pillow within expansion zone 54 for expanding and supporting extruded tubular film 39 circumferentially surrounding the mandrel extension 42 as it emerges from die outlet 47 and is pulled over sizing disk 31 which has a larger diameter than die mandrel 36. The use of a larger diameter reduces the likelihood of contact and adhesion of the molten polymer to the mandrel extension 42 during start up, enhances the maintainance of a gas tight seal between the flexible tube and the sizing disk 31, and provides a more cost effective means for preparing large diameter flexible tubes without costly dies having large diameter mandrels. Also, such a die permits a small diameter annulus having a large gap rather than requiring a large diameter annulus with small gap and, hence requiring exceedingly high operating pressures. Depending upon the relative diameters of die mandrel 36 and mandrel extension 42, recess 53 may comprise a series of recess segments instead of a continuous groove. More specifically, a continuous groove is necessary when the diameter of mandrel extension 42 approaches that of die mandrel 36 so that a segmented groove cannot provide a sufficient film of air to prevent extruded tubular film 39 from contacting and adhering to mandrel extension 42. In other words, the diameter of mandrel extension 42 in the region adjacent the junction of the mandrel extension 42 and die mandrel 36 should be smaller than the diameter of die mandrel 36 in order to space the extruded tubular film material film from the mandrel extension 42 to prevent contact and sticking of the extruded tubular film material to the mandrel extension 42 during start up. The difference in diameter and the minimum distance the region must extend axially downstream from the junction of the mandrel extension 42 and die mandrel 36 depends upon the specific materials, temperature, air velocity in channels 52 and other variables employed. Contact and sticking of the extruded tubular material to the mandrel extension during start up has always been encountered when the diameter of mandrel extension 42 in the region immediately adjacent the junction of the mandrel extension 42 and die mandrel 36 was equal to the diameter of die mandrel 36. Satisfactory results during startup have been achieved with mandrel extensions having a radius from about ⅛ inch to about ¾ inch shorter than the radius of the mandrel, the shorter radius region extending from about ⅝ inch to about ¼ inch axially downstream from the junction of the mandrel extension 42 and die mandrel 36. These dimensions are for purposes of illustration and other values outside these ranges may be utilized depending upon the specific materials and other conditions utilized. In any event, the diameter of the mandrel extension should be sufficently smaller than the diameter of the mandrel to prevent contact and sticking of the extruded tubular material to the mandrel extension during start up. Moreover, it should also be kept in mind that the diameter of the mandrel extension should also be large enough to permit housing of the service lines that supply any fluids, electricity, etc. to components downstream of the mandrel. The distribution of the air inlet channels 52 and air pressures need not be uniform along the recess 53. Moreover, the air inlet channels 52 may be perpendicular to or at any suitable acute or obtuse angle to the axis of mandrel extension 42. If desired, the outlets of air inlet channels 52 may be baffled, e.g. by a lip (not shown) of one side of recess 53 which overhangs the outlets of air inlet channels 52, thereby deflecting the path of air streams as they enter expansion zone 54 from the outlets of air inlet channels 52. The recess 53 in mandrel extension 42 serves to diffuse and control the air velocity and also facilitates start up of the extrusion process by preventing the extruded tubular film 39 from adhering to mandrel extension 40 as it initially emerges from the die outlet 47 and is manually pulled over the sizing disk 31 and stabilizing disk 32. Air from the expansion zone 54 is allowed to exit the cross-head extrusion die 30 through air exhaust channels 56 and air line 58. It is preferred that air exhaust channels 56 are angled away from die outlet 47 to prevent plugging by molten polymer during startup, shutdown and the like. The air supplied to the expansion zone 54 serves to expand, cool or heat, and provide physical support in the form of an air pillow for the extruded tubular film 39 and to maintain spacing between the extruded film 39 and mandrel extension 42 as shown in FIGS. 2 and 5. The air supplied to the expansion zone 54 is prevented from exiting between the extruded tubular film 48 and peripheral surface 60 of sizing disk 31 by the tight seal between the extruded tubular film 48 and peripheral surface 60 of sizing disk 31. The air may also provide a fluid lubricating film between the extruded tubular film 48 and peripheral surface 60 of sizing disk 31. Prior to introducing air from air line 50 into inlet channels 52, the air is passed through a baffle 61 to diffuse and control the air velocity thereby minimizing the formation of local non-uniform patterns and strong air currents in the air pillow formed in expansion zone 54. The baffle 61 may comprise, for example, organic or inorganic fibers such as brass wool. Pressurized air or other suitable gas such as nitrogen is supplied through air line 62 into stabilization zone 63 between sizing disk 31 and stabilizing disk 32 to stabilize and prevent collapse of extruded tubular film 39 as it is pulled past the sizing disk 31. The air inlet to stabilization zone 63 may simply be via a single tube such as air line 62. In light of the tight circumference tolerances required for the final extruded tubular film 39, it is beneficial to independently control the air pressures in expansion zone 54 and stabilization zone 63 during operation. During startup, much higher air pressure is needed in expansion zone 54, but when extruded tubular film 39 is first closed over sizing disk 31, the air pressure must be reduced immediately or else extruded tubular film 39 will burst. To facilitate this operational change over and to control the air pressures in expansion zone 54 and stabilization zone 63, an air distribution system, such as illustrated in FIGS. 5, 6 and 7 may be utilized. This air distribution system operates in three modes. In the starting up mode illustrated in FIG. 6, valve 64 is open, valve 65 is closed, and four-way valve 66 is set so that most of the air from air inlet line 67 flows to air line 50 and into expansion zone 54 (see also FIGS. 2 and 5). When extruded tubular film 39 has been closed over sizing disk 31, four-way valve 66 is switched, as shown in FIG. 7, to so that air flowing to expansion zone 54 via air line 50 flows through a high precision 0 psi–2 psi air regulator 68, and the remaining air flows to stabilization zone 63 via air line 62. When extruded tubular film 39 is closed over stabilizing disk 32, valve 64 is closed and valve 65 is opened so that air flowing from air inlet line 67 to stabilization zone 63 via air line 62 is directed through a high precision 0 psi–10 psi air regulator 69.

Referring again to FIG. 2, a valve (not shown) is fitted to the outlet of air line 58 to control the air flow from expansion zone 54. Cooling fluid is introduced through cooling fluid inlet line 70 into an annular cooling chamber 71 located near the periphery of sizing disk 31 and removed from annular cooling chamber 71 through cooling fluid outlet line 72. The upstream corner edge 73 of sizing disk 31 preferably has an angular cross section to prevent snagging or chattering of extruded tubular film 39. It appears that an upstream corner edge 73 having a rounded gradual cross section can allow extruded tubular film 39 to prematurely solidify with a circumference that may be too small to move over sizing disk 31 and cause chattering. Thus where chattering is undesirable or where extruded tubular film 39 cannot be drawn over sizing disk 31, the upstream corner edge 73 of sizing disk 31 preferably has a relatively sharp angular cross section. Moreover, the peripheral surface 74 of sizing disk 31 may, if desired, be gradually tapered toward the axis of the sizing disk 31 in the downstream direction to compensate for temperature shrinkage. The temperature of the cross-head extrusion die 30 is controlled by regulating the electrical power to resistance heater band 75 surrounding annular die body 34 and resistance heater band 72 surrounding adjustable die face 38. At least three and more preferably 8 to 16 spacing adjustment bolts 77 are arranged around the entire periphery of adjustable die face 38 in a generally radial orientation although other suitable bolt configurations may be employed if desired. These spacing adjustment bolts 77 allow changes to be effected between the position of adjustable die face 38 relative to the die mandrel 36. Adjustment of the spacing adjustment bolts 77 is made after mounting bolts (not shown) which secure the adjustable die face 38 to die mandrel 36. After adjustment of the spacing adjustment bolts 77 is completed, the mounting bolts are retightened to prevent movement of the adjustable die face 38 relative to the die mandrel 36. None of the spacing adjustment bolts 77 extend to the mandrel across the annular extrusion flow channel 40, thus eliminating a potential source of weld lines. The lines for air and cooling fluid are fed through a liner sleeve 78 fitted along the axis of die mandrel 36. The liner sleeve 78 may comprise insulating material, e.g. a ceramic liner, which insulates the air and cooling fluid lines from heat emanating from die mandrel 36 and promotes stability of the temperature of the die mandrel 36, polymer melt, etc. A seal 79 of brass or other suitable material in the hollow core 80 of mandrel extension 42 functions as an air barrier between air inlet channels 52 and air exhaust channels 56.

Figure 8:
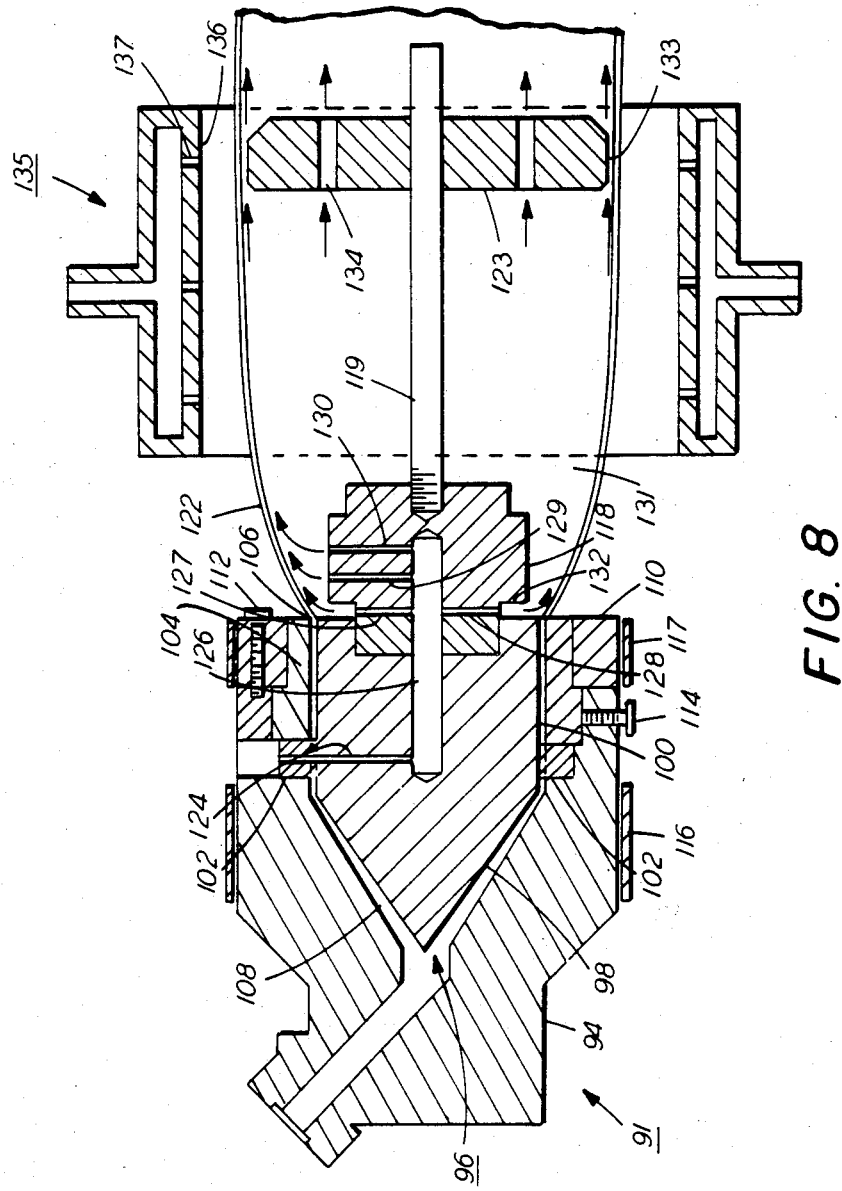
FIG. 8 is a schematic sectional view of another embodiment of an extrusion and shaping die assembly.

Referring to FIG. 8, an axial-head extrusion die 91 is shown which may be used as the extrusion die 16 shown FIG. 1. The axial-head extrusion die 91 comprises an annular die body 94 which encircles a floating die mandrel 96 having a conically shaped die mandrel segment 98 and a cylindrically shaped die mandrel segment 100. The floating die mandrel 96 is secured to annular die body 94 by at least three spiders 102 (only two shown in FIG. 8). Mounted to the annular die body 94 is an annular adjustable die face 104, which also encircles the die mandrel 96. The adjustable die face 104 allows adjustment of the die gap at the die outlet 106 between die mandrel 96 and adjustable die face 104 for film thickness variations. Annular die body 94 and annular adjustable die face 104 are spaced from die mandrel 96 and cooperate therewith to form an annular extrusion flow channel 108. The adjustable die face 104 is secured to annular die body 94 by retaining ring 110 and a plurality of retaining bolts 112 (only one shown in FIG. 8). Adjustments to die gap at the die outlet 106 are made by tightening or loosening adjustment bolts 114 (only one shown in FIG. 8). Generally, at least three adjustment bolts 114 are used to adequately control the dimensions of die gap at the die outlet 106. The temperature of the axial-head extrusion die 91 is controlled by regulating the electrical power to resistance heater bands 116 and 117 surrounding annular die body 94 and retaining ring 110, respectively. A mandrel extension 118 is secured to the cylindrically shaped die mandrel segment 100 of die mandrel 96. The mandrel extension 118 and support shaft 119 support a sizing disk 123 and spaces the sizing disk 123 from annular die body 94 to create an expansion zone 131 similar to that expansion zone 18 illustrated in FIG. 1.

In operation, a polymer melt from an extruder, such as the extruder 12 shown in FIG. 1, is pumped into annular die body 94 of axial-head extrusion die 91, through annular extrusion flow channel 108 and out die outlet 106 to form an extruded tubular film 122. Extruded tubular film 122 is pulled over a sizing disk 123 and a stabilizing disk (not shown) such as the stabilizing disk 22 shown in FIG. 1, by a tube puller (not shown) such as tube puller 24 shown in FIG. 1. Pressurized air is supplied from a suitable source such as that illustrated in FIGS. 5 6 and 7 through channel 124 in upper spider 102 and die mandrel 96, air chamber 126 and air inlet channels 127, 128, 129, and 130 to the expansion zone 131 to form an air pillow within expansion zone 131 for expanding and supporting extruded tubular film 122 as it emerges from die outlet 106 and is pulled over sizing disk 123. Air inlet channels 127 and 128 are arranged around the entire periphery of air chamber 126 in a generally radial orientation whereas air inlet channels 129 and 130 are positioned at least along the upper half of mandrel extension 118 to compensate for the effects of gravity on the extruded tubular film 122 when extrusion is effected in a horizontal orientation. When extrusion is carried out in a vertical orientation, the air inlet channels 129 and 130 would normally be arranged around the entire periphery of mandrel extension 118.

In addition, air supplied to expansion zone 131 from air inlet channels 127 and 128 is first fed through a recess 132 which serves to diffuse and reduce the velocity of the incoming air. The recess 132 in mandrel extension 118 also serves to diffuse and control the air velocity and permits start up of the extrusion process by preventing the drooping extruded tubular film 122 from adhering to mandrel extension 118 as it initially emerges from the die outlet 106. If desired, the outlets of air inlet channels 127 and 128 may be baffled, e.g. by a lip (not shown) on one side of recess 132 which overhangs the outlets of air inlet channels 127 and 128, thereby deflecting the path of air streams as they enter expansion zone 131 from the outlets of air inlet channels 127 and 128. As in the previously described cross-head extrusion die embodiment, the air supplied to the expansion zone 131 serves to expand, cool and provide physical support in the form of an air pillow for the extruded tubular film 122. When desired, the air supplied to the expansion zone 131 can be a source for air lubrication between the extruded tubular film 122 and peripheral surface 133 of sizing disk 123. The air from expansion zone 131 may optionally be bled out through bleed holes 134 in sizing disk 123.

An optional, exterior, pressure/vacuum floatation ring 135 is also shown in FIG. 8. During operation of the floatation ring 135, portions of the inner annular surface 136 of floatation ring 135 exerts suction or pressure via positive or negative air pressure on the exterior surface of extruded tubular film 122 through air channels 137, as desired, depending upon the specific materials extruded. The distribution of air channels 137 and pressures therethrough need not be uniform along the inner annular surface 136 of floatation ring 135. The axial lengths of the mandrel extension 118 and floatation ring 135 may be selected so that the molten extruded tubular film 122 extruded from the die 91 is supported by air floatation as the tubular film 122 exits from the die outlet 106 region. The tubular film 122 is supported by air floatation along its axial path to the sizing disk 123. The tubular film 122 is supported a sufficient distance along its axial path until its shape is secured by solidification of the molten material. Solidification may occur prior to, during, or subsequent to passage of the tube over the outer peripheral surface 123 of the sizing disk 123. Solidification may occasionally be visually identified by a marked change in transparency around the periphery of the tubular film 123 and is referred to as a "freezeline".

The floatation ring 135 and mandrel extension 118 may have an axial length, for example, on the order of about 12 inches and the difference between the inside face diameter of the floatation ring 135 and the outside diameter of the extruded tubular film 122 may, for example, be from about 0.005 to about 1 inch. Preferably, the tube should be maintained out of contact with the mandrel extension 118 and the floatation ring 135. However, when the annular sizing disk 123 is utilized to create and maintain a compressed air pocket or air pillow in the annular region between the mandrel extension and tube, the tube may be permitted to contact the floatation ring. Contact with the floatation ring 135 may be desirable for exterior sizing or imparting texture to the exterior of the extruded tubular film 122. The floatation ring 135 and annular sizing disk 123 may act in concert to share the load or act in opposition to enhance stability and reduce sensitivity.

Figures 9, 10:
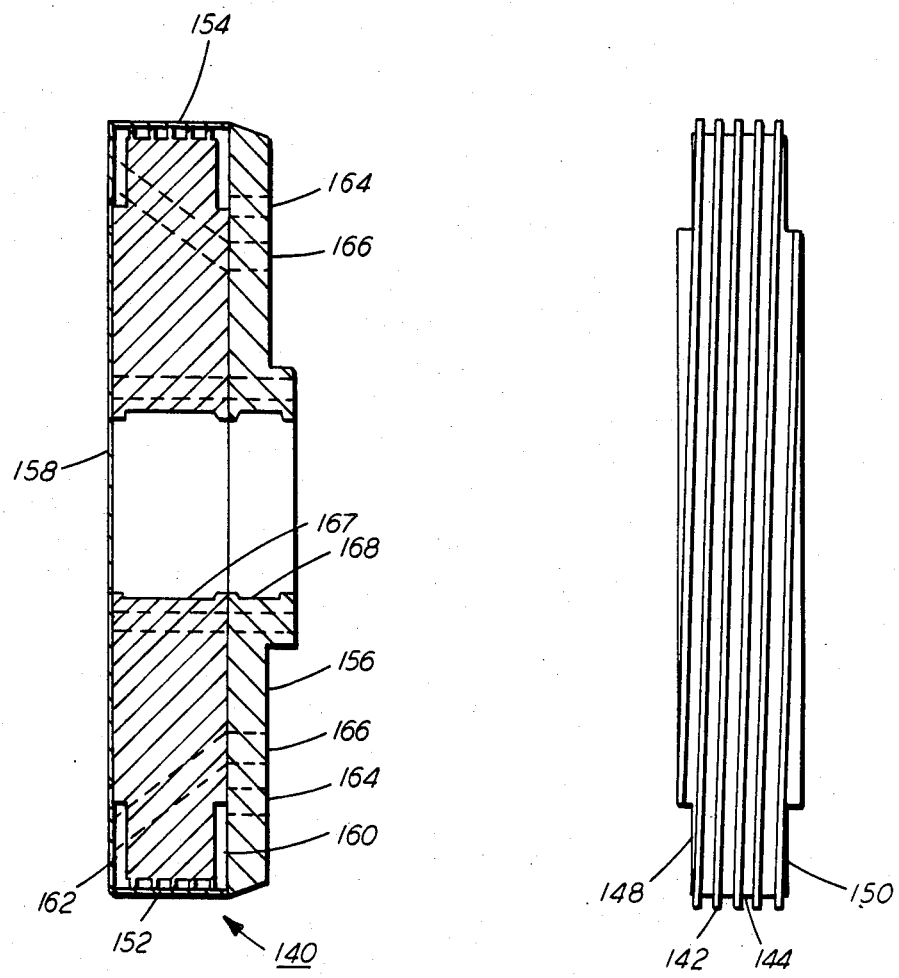
FIG. 9 is a schematic sectional view of one sizing disk embodiment for the extrusion and shaping die assembly.
FIG. 10 is a schematic sectional view of a component of the sizing disk embodiment illustrated in FIG. 9.

Referring to FIGS. 9 and 10, an alternative embodiment of a sizing disk utilizing a cooling or heating medium is shown comprising a sizing disk 140 having a ridge 142 which describes a spiral path around the outer peripheral surface 144 of sizing disk 140. If desired, one or more parallel spiral paths for co-current or counter-current heat exchange medium flow may be utilized. Grooves 148 and 150 also ring the outer perimeter of each side of sizing disk 140 for heat exchange medium entry and exit. A sleeve 152 is fitted tightly against the peak of ridge 142 to form at least one long spiral chamber 154 around the outer peripheral surface 144 of disk 140. A tight fit may be achieved by any suitable means such as mere mechanical fittings such as bolts and/or via the influence of temperature. The sizing disk 140 and sleeve 144 are tightly sandwiched between a retaining plate 156 and a face plate 158 or an integrally machined part to create annular channel 160 and annular channel 162, respectively. In operation, a cooling or heating fluid, such as water, is fed through inlet channels 164 to annular channel 160, to spiral chamber 154, to annular channel 162 and exhausted through outlet channels 166. This embodiment is intended to improve uniformity of cooling of the outer peripheral surface 144, i.e. the outer surface of sleeve 152. Also illustrated in FIG. 9 is the use of annular channels 167 and 168 to thermally insulate sizing disk 140 from the supporting mandrel extension or support shaft. Other suitable means to insulate the sizing disk, such as ceramic sleeves and the like, may be used in place of or in addition to the annular channels. Moreover, one or more air bleed ports may optionally be incorporated into the structure of sizing disk 140 to allow fluid to pass through.

Figure 11:
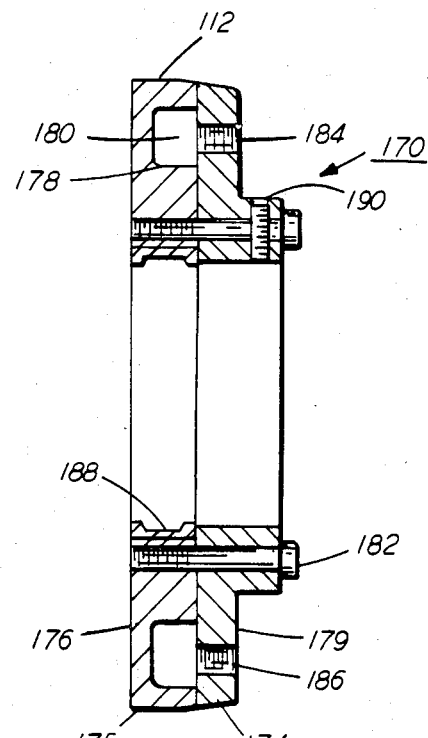
FIG. 11 is a schematic sectional view of another sizing disk embodiment for the extrusion and shaping die assembly.
Figure 12:
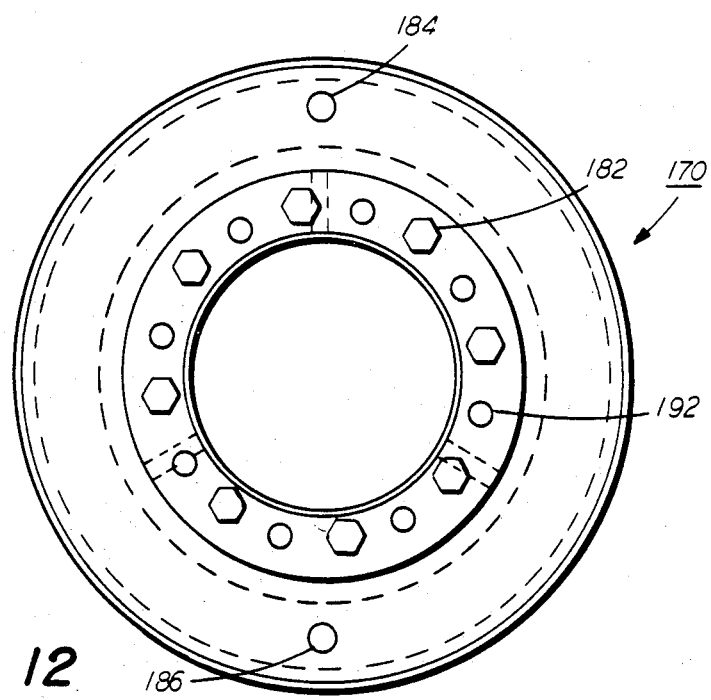
FIG. 12 is another schematic sectional view of the sizing disk embodiment for the extrusion and shaping die assembly illustrated in FIG. 11.

Another embodiment of a sizing disk is shown in FIGS. 11 and 12 comprising a sizing disk 170 having outer peripheral surface 172 having a tapered segment 174 sloping downwardly in a downstream direction. The leading corner 175 on the upstream side of sizing disk 170 should preferably have a sharp edge because operation has shown that a round gradual cross section allowed the tube to solidify with too small of a circumference and either cause chatter and chatter marks (which may be desirable in some applications) or cause the tube to be too small to pull over sizing disk 170 at startup. One side of disk 176 contains an annular groove 178 near its outer perimeter. A face plate 179 covers annular groove 178 to create annular channel 180. Face plate 178 is secured to disk 176 by means of a sealing compound and a plurality of mounting screws 182. In operation, a cooling liquid, such as water, is fed through inlet channel 184 to annular channel 180 and exhausted through outlet channel 186. If desired, a plurality of inlet and outlet channels may be employed. Also illustrated in FIG. 11 is the use of annular channel 188 to thermally insulate sizing disk 170 from the supporting mandrel extension or support shaft. Other suitable means to insulate the sizing disk may be used in place of or in addition to the annular channel 188. Set screws 190 are provided to fasten sizing disk 170 to the supporting mandrel extension or support shaft. Optional air bleed holes 192 may be used to facilitate removal of air from the expansion zone when such air removal is deemed desirable. Air bleed holes 192 may be threaded to allow insertion of threaded plugs (not shown) to prevent air form flowing through air bleed holes 192.

Figure 14:
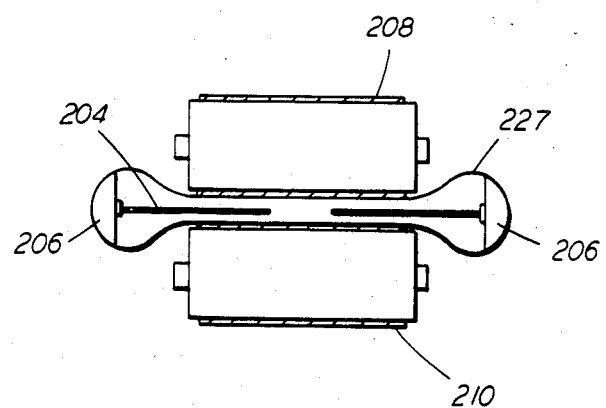
FIG. 14 is a schematic sectional view along line BB of the tubular film puller illustrated in FIG. 20.
Figure 13:
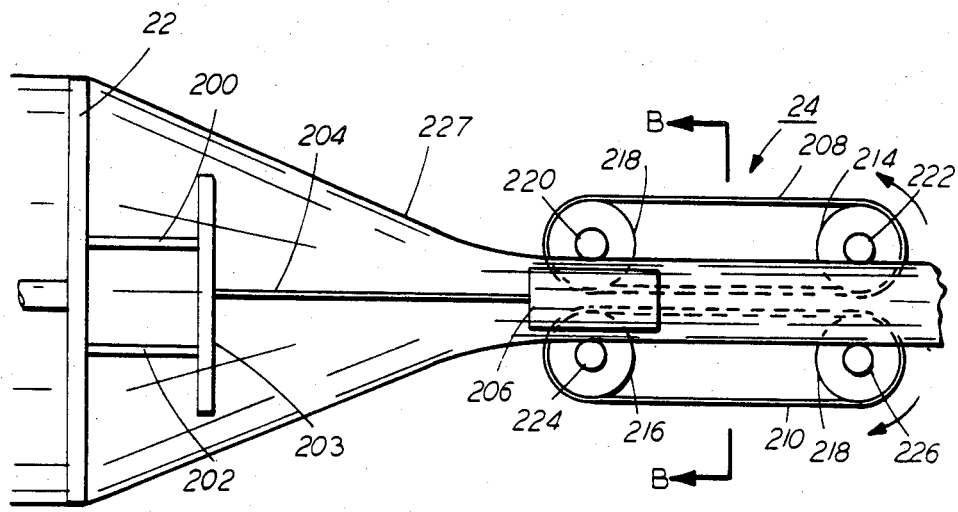
FIG. 13 is a schematic sectional view of a tubular film puller for pulling the tubular film from the extrusion and shaping die assembly of the present invention.

Further details are provided in FIGS. 13 and 14 of the stabilizing disk 22 and tubular film puller 24 illustrated in FIG. 1. FIG. 14 is a sectional view of FIG. 13 in the direction depicted by the arrows BB. Stabilizing disk 22 has mounted thereto three mounting plates 200, 202, and 203 which function as a cantilevered support for guide shoe support arms 204 and guide shoes 206. Guide shoes 206 are positioned on each side of tubular film puller 24. Tubular film puller 24 comprises a pair of flexible belts 208 and 210 mounted on rollers 212 and 214 and rollers 216 and 218, respectively. The rollers 212, 214, 216, and 218 ride on shafts 213, 222, 224 and 226, respectively. Shafts 213, 222, 224 and 226 are mounted on a suitable support not shown. At least one roller for each flexible belt is driven by a suitable driving means not shown. The flexible belts 208 and 210 may be fabricated of any suitable flexible homogeneous or composite material such as natural rubber, synthetic rubber, flexible foam, fiber reinforced rubber, and the like.

In operation, the extruded tubular film 227 is pulled over stabilizing disk 22 by tubular film puller 24. In order to achieve a creaseless tubular film 227, an edge on each side of the extruded tubular film 227 is allowed to extend out beyond each side of flexible belts 208 and 210 to avoid being flattened during the pulling operation. A cross-sectional view of the tubular film 227 along BB is shown in FIG. 14. As tubular film 227 is drawn between the flexible belts 2 and 210 it takes on the cross-sectional shape of a dumbbell. Guide shoes 206 ride on the inside surface of the ends of the dumbbell shaped segment of extruded tubular film 227 to ensure tracking of the tubular film 227 through tubular film puller 24. These guide shoes may 206 contact the inside surface of extruded tubular film 227 either before, during and/or after the surface passes rollers 212 and 216. Although guide shoes 206 are shown in FIG. 14 as having a half circle cross section, any other suitable shape such as a full circle, oval, and the like may be used. As illustrated in FIGS. 13 and 14, the the inner surfaces of the opposite sides of tubular film 227 need not touch each other as the film 327 is drawn between flexible belts 208 and 210. For example, the tubular film 227 to belt frictional force or tube film to belt electrostatic attractive force may be sufficient to pull the film.

Figure 15:
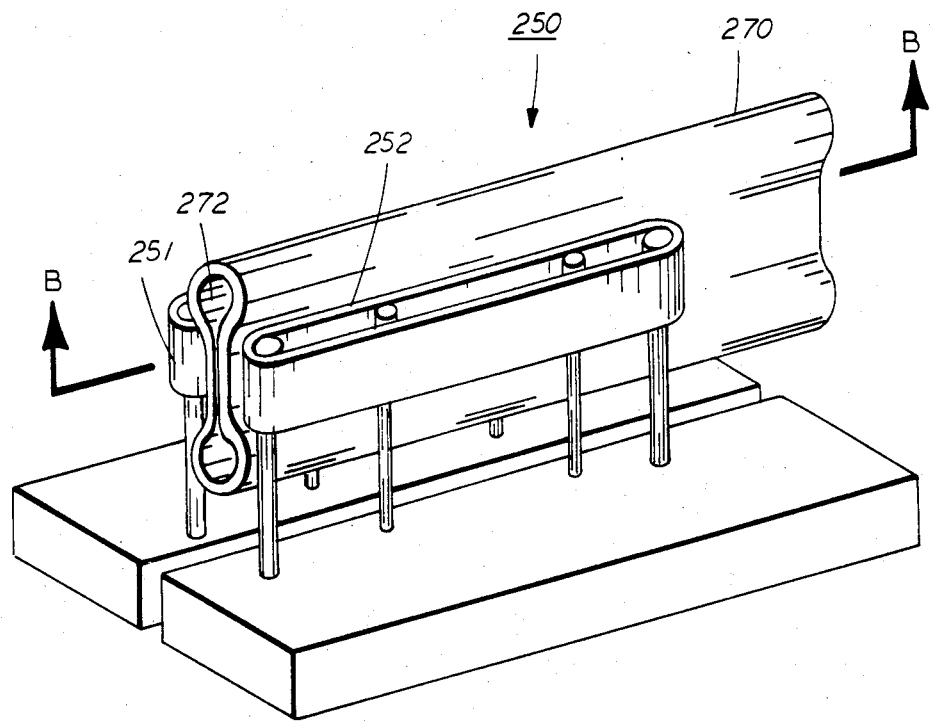
FIG. 15 is a schematic isometric sectional view of a tubular film puller.
Figure 16:
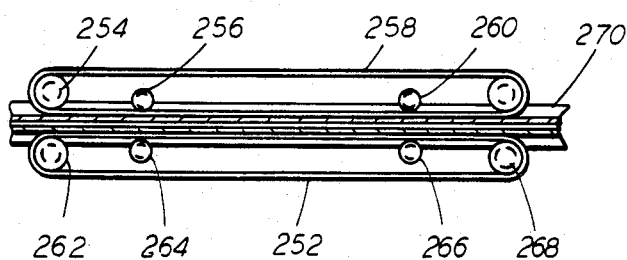
FIG. 16 is a sectional view taken along BB of the tube puller illustrated in FIG. 15.

In FIGS. 15 and 16, an alternative embodiment of a tubular film puller 24 illustrated. This tubular film puller 250 comprises a pair of flexible belts 251 and 252 mounted on drive roller 254, pressure rollers 256 and 258 and idler roller 260 and drive roller 262, pressure rollers 264 and 266 and idler roller 268, respectively. The flexible belts 251 and 252 extend along the the axis of the tube 270. The flexible belts 251 and 252 are generally long and narrow and are positioned on diametrically opposite sides of tube 270 to compress the middle region of the tube between the active faces of the flexible belts 251 and 252 until the inner faces of tube 270 are closely spaced from each other or in actual contact with each other. The width of the flexible belts 251 and 252 are selected so that the tube extends out beyond the edges of the flexible belts 251 and 252 to form a cross section similar to a squashed figure 8. Because of the small radius of curvature at each end 272 of the squashed figure 8 cross section, the tube 270 is not creased or permanently deformed. The length of the flexible belts 251 and 252 are chosen to provide sufficient frictional contact to pull the tube 270 away from the die.

For embodiments where a crease or other deformation of the tube cannot be tolerated due to product functionality requirements or high cost due to large material waste, one may optionally utilize an expansion vacuum floatation ring located adjacent the exit of the tubular film puller 24 illustrated in FIG. 1. The inclusion of the expansion vacuum floatation ring in the extrusion line is optional in the sense that some materials may permit the tube to go directly from the tubular film puller 24 to a cutter without reshaping of the tube. More specifically, when the extrudate leaves the puller 250, the thin-wall, large-diameter extruded tubular film 17 of molten polymer or polymer composite normally is in a partially collapsed state having a cross section similar to a figure 8. To return the tubular film 17 to a tubular shape and to facilitate certain embodiments for cutting of the tube, an expansion vacuum floatation ring 25 such as the one illustrated in FIG. 1 may optionally be positioned immediately adjacent the tubular film puller 24 exit. Thus, this expansion vacuum floatation ring may be similar in construction and operation to the post-die pressure/vacuum floatation ring 135 shown in FIG. 8 except that the ring is operated with negative pressure (relative to atmospheric pressure) completely around its circumferential periphery. The distribution and size of holes are selected to overcome the gravitational effects of a horizontally extruded tube and to prevent contact of the outside surface of the tube with the inner surface of the expansion ring. The length and distribution of holes in the ring are selected to ensure that once the tube has been manually positioned inside the ring during startup of the extrusion line that the shape is maintained during extrusion line operation. The inside diameter of the expansion vacuum floatation ring 25 is slightly larger than the outside diameter of the extruded tube 17 thereby permitting the extruded tube to pass without encountering any obstructions through the expansion vacuum floatation ring 25 in a direction along its axis. Alternatively, the tube 17 may be allowed to contact a seal such as Teflon. Support is provided by the expansion vacuum floatation ring 25 by means of negative pressures (relative to atmospheric pressure) applied simultaneously at the upper and lower regions at the interface between tube 17 and the expansion vacuum floatation ring 25. If desired, the support vacuum-pressure floatation ring may be operated only with negative pressure in the upper region of the interface between the expansion vacuum floatation ring 25 and the tube 17 and at atmospheric pressure in the lower region of the interface. If holes of uniform diameter are employed, more of such holes may be employed at the upper segment of the interface of the support vacuum-pressure floatation ring than the lower segment in order to counterbalance the force of gravity. Moreover, the pressures (positive and negative) around the circumferential periphery of the interface of the support vacuum-pressure floatation ring may be controlled so that the permanent shape or thickness deformation is not induced into the final cylindrical product.

Figure 17:
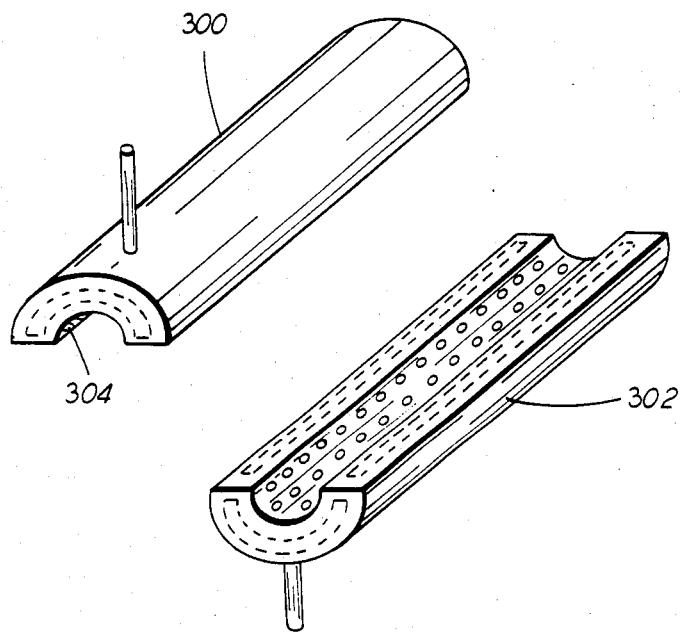
FIG. 17 is a schematic isometric sectional view of one embodiment of an expansion vacuum floatation ring.
Figure 18:
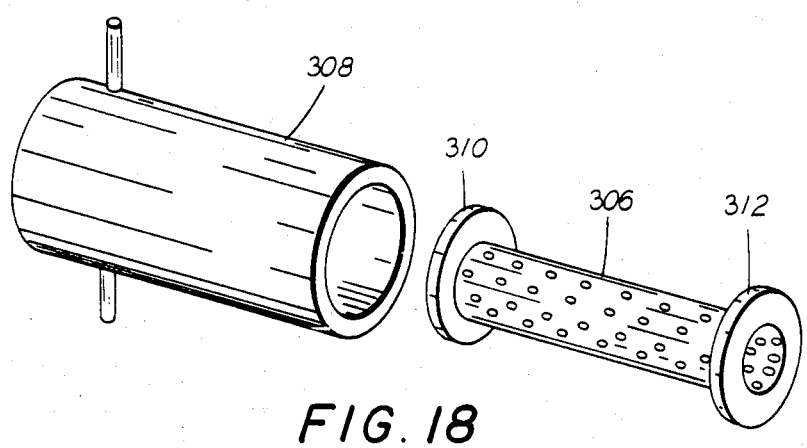
FIG. 18 is a schematic isometric sectional view of another embodiment of an expansion vacuum floatation ring.

An alternative embodiment of the expansion vacuum floatation ring 25 is depicted in FIG. 17 wherein the floatation ring comprises an upper segment 300, vacuum port 301, lower segment 302 and vacuum/pressure port 303. Portions of the inner annular surface of each of the floatation ring segments 300 and 302 may exert suction via negative air pressure on the exterior surface of the extruded tubular film 17 through air channels 304, as desired, depending upon the specific materials employed to form the tubular film 17. The size and distribution of air channels 304 and pressures therethrough need not be uniform along the entire inner annular surface of each floatation ring segment 300 and 302. The tubular film 17 is supported by the floatation ring along its axial path to the cutter 26. Still another alternative embodiment of the expansion vacuum floatation ring 25 is shown in FIG. 18 comprising an inner foraminous core 306 which is inserted within a cylindrical shell 308. The ends of the inner foraminous core 304 carry flanges 310 and 312 which function as seals.

Figure 19:
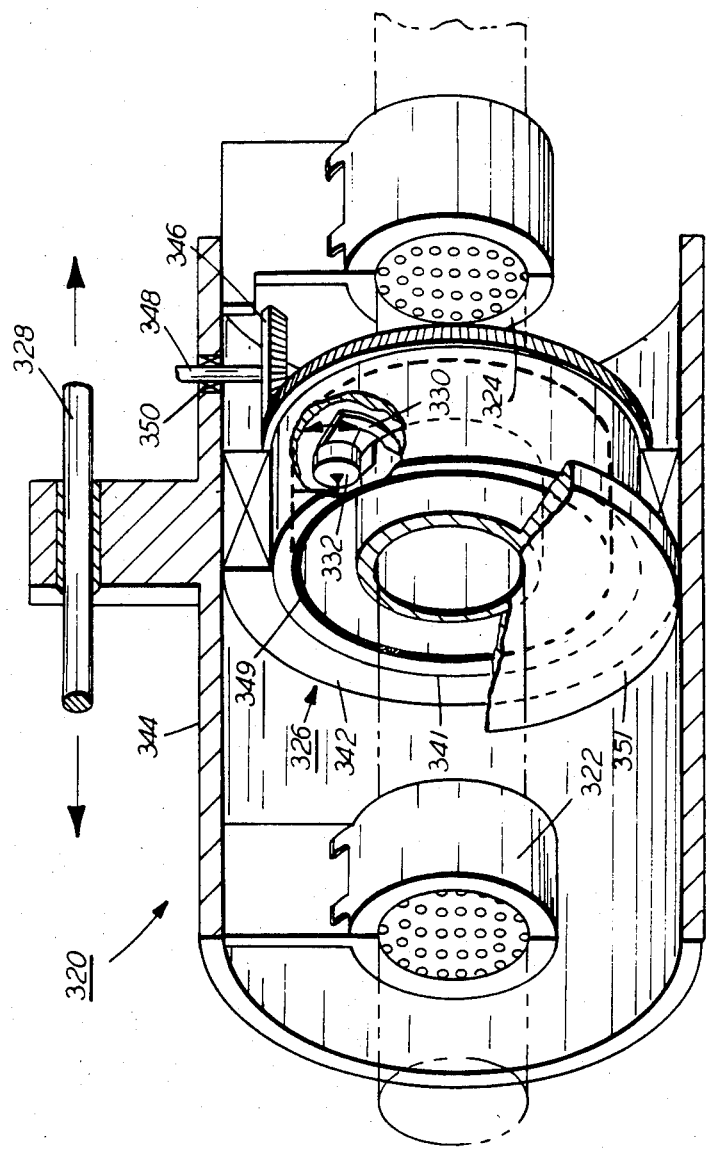
FIG. 19 is a schematic isometric sectional view of a tube cutter.

The expanded tube 17 exiting the expansion vacuum floatation ring 25 is then directed to a cutter 26 illustrated in FIG. 1. The cutter 26 may comprise a travelling vacuum cutter 320 illustrated in FIG. 19 comprising two closely positioned hinged split vacuum rings, one upstream hinged split vacuum ring 322 and the other downstream hinged split vacuum ring 324. These closely adjacent split vacuum rings securely grip the extruded tube 17 and maintain it in an expanded cylindrical shape while a cutting means 326 cuts the tube 17 along its circumference. The upstream split vacuum ring 322 also serves as a shape expanding ring when it is slightly open. The entire cutter 26 slides on one or more support shafts 328 and travels with the tube 17 in a coordinated and controlled longitudinal direction with the split vacuum rings 322 and 324 closing on and gripping the tube 17 as it travels away from the tubular film puller 24 and thereafter opening and moving away from the tube to permit tube slippage during the reverse or upstream motion of the travelling vacuum cutter 320. If desired, the cutter 26 may be fixed to support shaft 328 and the support shafts 328 may be slidably mounted in any suitable support means (not shown). The cutter 26 may be reciprocated by any suitable means (not shown) such as a cable driven by a pulley mounted on a reversible motor, an air or hydraulically driven reciprocating piston, a reversible motor driven friction wheel or gear adapted to engage shaft 328 or housing 344 and the like. The cutting assembly 326 may comprise any suitable device such as the reversibly rotatable cutting blade 330 illustrated in FIG. 19. Reversibly rotatable cutting blade 330 is reversibly rotated by a rotary solenoid 332, although any other suitable means such as a synchro may be employed. Alternatively, a reciprocating blade 334 mounted on a reciprocatable support 336 shown in FIG. 20 or a small high speed rotating blade such as a circular saw disk 338 mounted on a reciprocatable support 340 illustrated in FIG. 21 may be substituted for the reversibly rotatable cutting blade 330. The reciprocatable supports 332 and 340 may be driven by a conventional solenoid (not shown) to extend and retract supports 332 and 340. Activation and inactivation of the solenoid engages and disengages each blade with the tube 17. The cutting assembly 326 also may comprise a constantly rotating beveled ring gear assembly 341 on which is mounted the cutting blade 330. The ring gear assembly 341 rides on a bearing 342 secured to the the inside surface of cutter housing 344. The gear assembly 341 is rotated by means of a beveled drive gear 346 supported on a shaft 348 which in turn rides on a bearing 350 in cutter housing 344. Shaft 348 is driven by a conventional motor and transmission assembly (not shown). Electrical power may be fed to the rotary solenoid 332 through suitable wiring (not shown) from multiple slip rings 349 on ring gear assembly 341 which are in contact with electrical contacts (not shown) such as brushes or shoe electrodes supported on flange 351 secured to cutter housing 344. Thus, upon activation of the solenoid, the blade 330 first pierces the tube 17 and then follows a circumferential slicing path around the tube. The hinged split rings 322 and 324, when open, allow free passage of the tube 17 and, when closed, securely grip the tube 17 and maintain it in an expanded circular shape while the cutting blade cuts the tube 17 as it moves circumferentially around the tube. the different.

Figure 22:
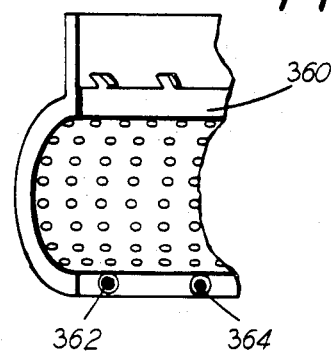
FIG. 22 is a schematic isometric sectional view of a ring segment from the cutter illustrated in FIG. 19.
Figure 23:
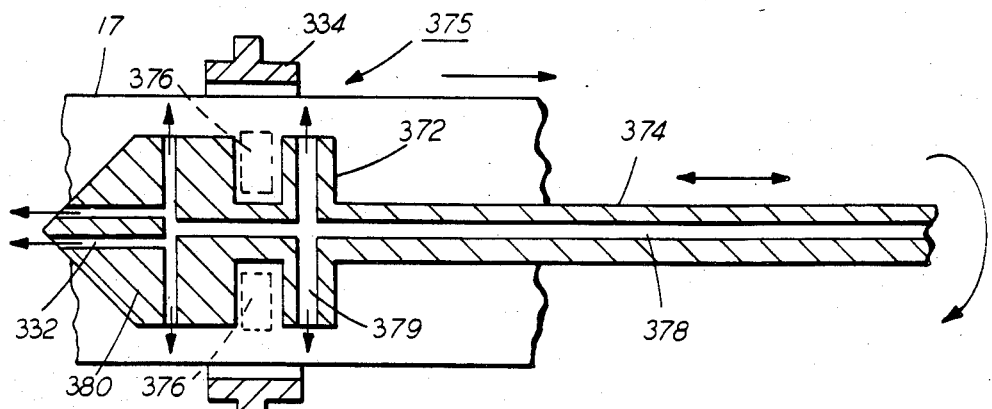
FIG. 23 is a schematic sectional view of another embodiment for cutting the tube.

In FIG. 22 a half a split vacuum ring segment 360 is illustrated to show embedded electromagnets 362 and 364. The opening and closing (gripping) movements and forces of the upstream hinged split vacuum ring 322 and downstream hinged split vacuum ring 324 may be controlled by modulating the electric current feeding electromagnets 362 and 364 through connecting wires (not shown) to form north-north or north-south magnetic poles in mating electromagnets. Conventional limit switches, may be employed limit the length of the longitudinal reciprocations of cutter 26 and overall coordination of the reciprocations of the cutter 26, cutting blade 330, opening and closing of upstream hinged split vacuum ring 322 and downstream hinged split vacuum ring 324, activation of pressure and vacuum valves, and other line variables may be controlled by any suitable commercial computer.

Various cutters have been described that act upon the tube from the outside. Alternatively, a cutter may be used which acts upon the tube 17 from the inside. One embodiment of such a cutter 370 is illustrated in FIG. 33. This type of cutter is normally positioned at the end of the open tube at the end of the extrusion line and operates in a manner similar to a plunger reciprocating along the axis of the tube 17 in a controlled motion coordinated to speed of tube 17 and the length of the cut cylinder desired. The cutter 370 comprises a plunger head 372 mounted on a constantly rotating plunger shaft 374. The plunger head comprises any suitable cutting means 376 such as a solenoid activated blade described with reference to FIGS. 19, 20 and 21 except that the blade moves toward and away from the interior rather than the exterior of tube 17. Alternatively, the cutting means 376 may comprise a laser which cuts, burns or melts through the tube 17. In order to maintain the tube 17 in a generally cylindrical shape during cutting and to form a small gap between the tube 17 and plunger head 372, a fluid is optionally introduced through channels 378, 379, 380, and 382. Since the tube 17 is moving, the cutting means 376 follows a spiral path relative to a stationary point of reference in order to produce a right cylinder from the moving tube. A travelling split support ring 384 may optionally be used to facilitate cutting of tube 17. Support ring 384 may be mounted on one or more guide rods (not shown) similar to arrangement shown for travelling vacuum cutter 320 illustrated in FIG. 19 and reciprocated in a timed relationship with cutting means 376. A cutter operating from the inside of the tube is generally less desirable than a cutter on the outside because of the need to remove the cylindrical cut tube from the plunger prior to the next cutting operation.

Figure 24:
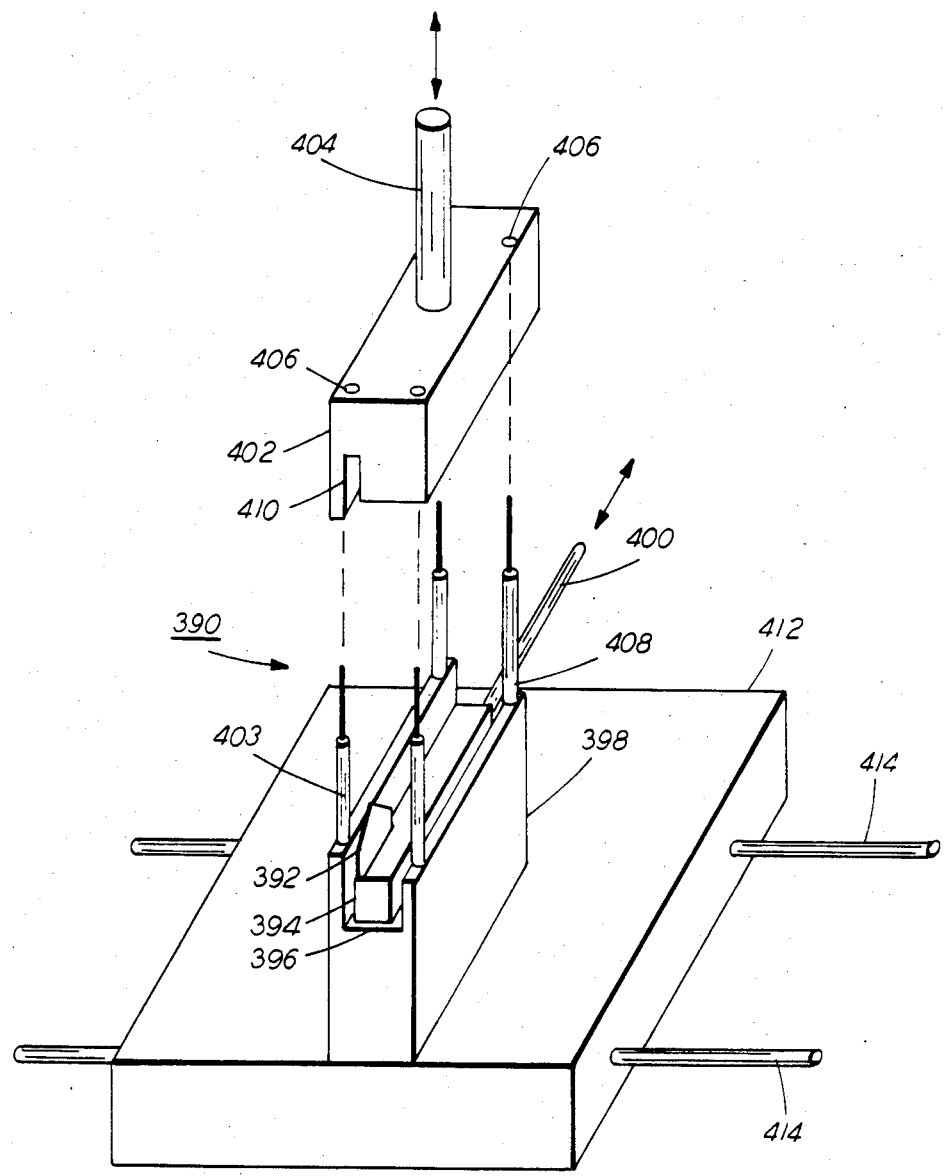
FIG. 24 is an isometric view of traveling shearing cutter.
Figure 25:
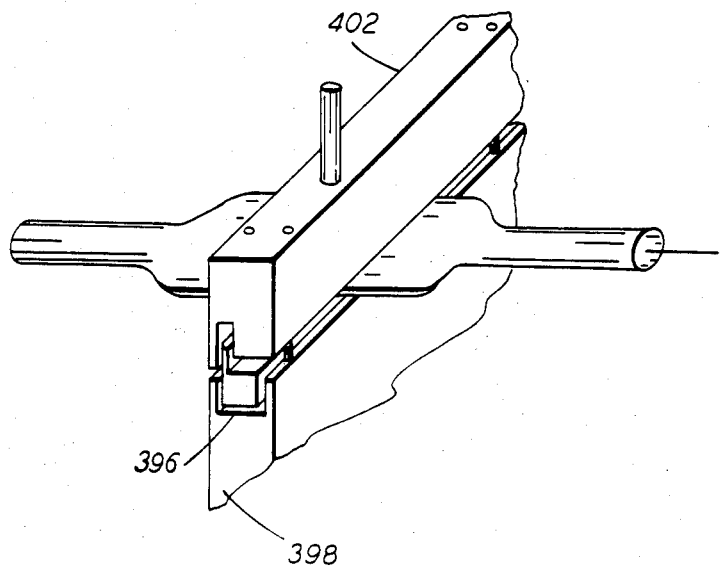
FIG. 25 is another isometric view of the shearing travelling cutter illustrated in FIG. 24.

For cylindrical products in which a short crease is permissible at two diametrically opposite points on each cylinder edge but extending only a very short distance axially along the cylinder, one may utilize a shearing travelling cutting unit 390 illustrated in FIGS. 24 and 25. These short creases (e.g. about ⅛ inch long) may, for example, be acceptable for simple, relatively unsophisticated, low speed electrostatographic copiers and printers. For this type of belt, the tube 17 may retain a cross section resembling that of a squashed figure 8 upon exiting from the tubular film puller 24 and entering cutter 26 for processing and no expansion to a cylindrical shape is necessary. Travelling cutting unit 390 comprises a blade 392 mounted in a blade holder 394 which is adapted to reciprocate in channel 396 of tube support member 398. Reciprocation of blade holder 394 in channel 396 is effected by a connecting rod 400 which is driven by a suitable means (not shown) such as a crankshaft, worm gear or the like. Blade 392 may have a cutting edge on both sides to permit cutting of tube 17 on both strokes. A tube gripping bar 402 positioned above tube support member 398 is raised and lowered by any suitable conventional means such as by the solenoids illustrated in FIG. 26, pneumatic pistons, and the like connected to rod 404. Tube gripping bar 402 contains four guide channels 406 which allow tube gripping bar 402 to reciprocate on guide rods 408 and remain in alignment with tube support member 398. Although tube gripping bar 402 and tube support member 398 contact and flatten tube 17, a sufficient gap is maintained between tube gripping bar 402 and tube support member 398 to allow tube 17 to slip loosely through the gap and prevent or minimize permanent deformation of tube 17. Blade channel 410 assists reciprocating blade 392 in cleanly slicing tube 17 orthogonally to the line of motion of the tube. Tube support member 398 is secured to a reciprocating platform 412 which rides on guide rods 414. Reciprocating platform 412 may be reciprocated by any suitable conventional means (not shown) such as a cable driven by a pulley mounted on a reversible motor, an air or hydraulically driven reciprocating piston, and the like. Alternatively, the platform 412 may be stationary and/or a vertically reciprocating guillotine blade (not shown) secured to a member similar to tube gripping bar 402 may be substituted for the shearing blade 392. High speed impact air cylinders may be more preferred for reciprocating guillotine blades than solenoids. Surprisingly, the stabilizing disk and tube puller insulate the senstive molten tube between the die and sizing disk from any disruptive vibrations caused by the use of stationary cutters such guillotine cutters. Because of the short creases formed, shearing cutters of the type shown in FIGS. 24 and 25 and guillotine cutters are less preferred than the rotary type cutters illustrated, for example in FIGS. 19 through 23.

Figure 20:
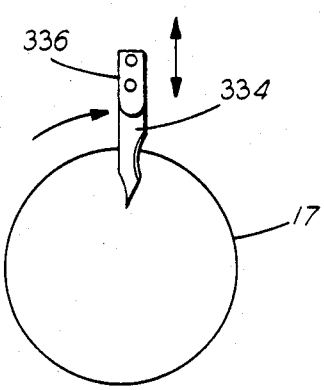
FIG. 20 is a schematic sectional view of a cutting means for the cutter illustrated in FIG. 19.
Figure 21:
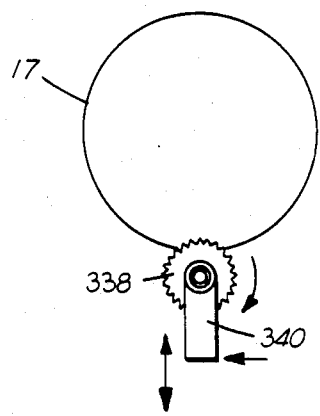
FIG. 21 is a schematic sectional view of still another embodiment of a cutting means for the cutter illustrated in FIG. 19.
Figure 26:
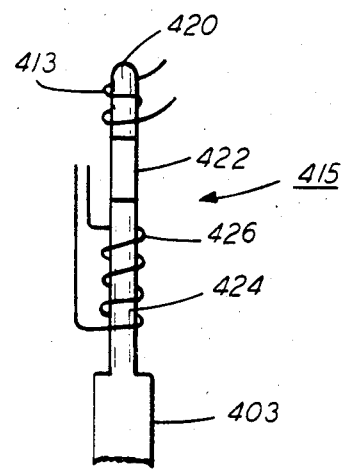
FIG. 26 represents one embodiment of means to raise and lower the vertically reciprocating element of the shearing travelling cutter illustrated in FIG. 24.

The gripping force and up/down motion of the gripping bar 402 as well as other components of the apparatus of this invention such as the reciprocatable supports 336 and 340 shown in FIGS. 20 and 21, respectively, may be controlled by modulating two independent electromagnets in a control device 406 illustrated in FIG. 26. Control device 416 comprises an electromagnet clamping coil 418, electromagnet clamping core 420, nonmagnetic spacer 422, electromagnet lifting core 424 and electromagnet lifting coil 426 mounted on guide rod 408. In operation, at least one coil is not aligned with its core at all times. Lifting and lowering is effected by using north-north or north-south principals and modulating field strength via application of current.

It is expected that the travelling cutters described above would normally be the limiting factor in line speed so that line speed would normally range from about 1 foot per 5 to 10 seconds. Generally, the lighter the moving mass of the cutter, the greater the potential speed of the extrusion line.

The two types of dies previously described include the axial (straight-through flow) die and the cross-head (offset) die. The designs of the two dies differ according to the mode of entry of the polymer melt into the annular extrusion flow channel and the means of supporting the die mandrel. For the axial-head die, the symmetrical design of the die is intended to provide even flow of the polymer melt through the entry region from an extruder as well as through the annular extrusion flow channel resulting, ideally, in extruded annular profiles with constant thickness walls. The mandrel in an axial-head extrusion die is held in place with support mounting bolts or streamlined "spiders" extending to the mandrel from the die body. These supports tend to interrupt the flow of polymer in the annular channel and may create longitudinal seams or "weld lines" in the extruded tube. The weld line formation is aggravated when air and/or cooling fluids flow through passages in the spiders to the mandrel to service downstream sizing equipment. As shown in FIG. 8, air is supplied to the mandrel and mandrel extension via an air passage in one of the spiders. Since the spider must extend through the melt flow channel, the air flow cools the melt surrounding the spider, thus aggravating weld line formation. This cooling effect drastically increases the polymer melt viscosity in this region. This, in turn, causes the melt flow rate to decrease resulting in a decrease in film thickness downstream as well as surface imperfections at the die exit. These effects can be minimized by adjustments to the air flow rate and temperature as well as the melt temperature and die gap eccentricity to regulate the thickness tolerances desired for a photoreceptor belt, typically one percent of the mean thickness. Although it is possible to heat the mandrel electrically, the electrical connections to the heating element and thermocouple must pass through the mandrel support arms.

A preferred alternative approach, however, is to use a cross-head die configuration with the mandrel extending through the entire length of the die, and supply air to the mandrel and mandrel extension from the rear of the die. Entry of the polymer melt to the annular flow channel in the crosshead die configuration is often at right angles to the die axis, as shown in FIG. 2, resulting in a diversion of flow around the mandrel. The severing of flow results in the creation of one weld line (as compared to several weld lines in axial-head dies). Various configurations for minimizing or eliminating the creation of weld lines may be employed. For example, spiral entry configuration type dies with multiple feed ports, dies with upstream distribution configurations and die with downstream strainer-type mixing sections may be used. The effect of weld lines may further be minimized by the use of downstream ridges, "chokes", or other suitable mixing sections. The choke ridges may have any suitable cross-sectional shape such as a hemisphere, pyramid and the like. Moreover, it may be arranged in any suitable manner around the periphery of the annular die body, annular adjustable die face or die mandrel, e.g. one or more rings, a spiral, combinations thereof and the like.

To extrude tubular films, it is necessary for the polymer melt to flow through the annular extrusion flow channel of the extrusion die. The inner surface of the annular die body, particularly the inner surface of an annular adjustable die face of the die body of a crosshead extrusion die at the die outlet, forms the outer surface of the extrusion chamber and the outer surface of the mandrel or "plug" forms the inner surface of the annular extrusion flow channel. Moreover, the die lip configuration may be altered at the die exit to modify the surface quality of the extruded tubular film. The die surface may, if desired, also be roughened by a suitable process such as acid etching or sand blasting to modify the surface quality of the extruded films. To achieve a symmetrical product, a means such as adjustable bolts for manually adjusting the eccentricity of the mandrel relative to the adjacent surface of the die body is provided. The degree of eccentricity depends to some extent on the path of the extruded molten tube relative to horizontal, e.g. whether the extruded molten tube path extends in a generally horizontal or vertical direction. Generally, the die annulus gap at the die outlet may be in the order of about 0.010 inch to about 0.060 inch. The annular extrusion flow channel dimensions are selected so that the pressure drop across the die from the entrance to the outlet including adaptors and the like is less than the maximum pressure obtainable from the extruder for a given desired throughput rate of the polymer.

The axial-head die and the crosshead die described in the present invention are similar in many respects to annular exit cross section dies utilized commercially for blown film extrusion and pipe extrusion. Ref. *Principles of Polymer Processing*, Z. Tadmor and C. G. Gogos, Wiley-Interscience, New York (1979), pp. 551–554; *Plastic Molds and Dies*, L. Sors, L. Bardocz and I. Radnoti, VanNostrand Reinhold Co., New York (1981), pp. 208–211; and *Extrusion Dies—Design and Engineering Computations*, W. Michaeli, Hanser Publishers, Munich, Vienna, New York (1984); pp. 137–161. The present invention is not restricted to the use of axial or crosshead dies. We have also used a spiral mandrel die which is of the type commonly used currently in the film blowing industry. Ref. above publications (Tadmor and Gogos, Michaeli). This die was modified similarly to the axial and cross-head dies shown herein.

The mandrel extension provides air and liquid passages for the purpose of cooling, expanding, and physically supporting the extruded tubular film immediately upon exiting from the die. The diameter of the mandrel extension immediately adjacent the mandrel is less than that of the diameter of the mandrel. A typical difference between the outside diameter of the mandrel and the outside diameter of the mandrel extension may be, for example, from about 0.005 inch to about 1 inch. The diameter of the mandrel may be larger, equal to or smaller than the mandrel downstream from the recess where contact with the extruded tubular film is unlikely to occur during start up. Typical cross sectional dimensions for recesses having vertical sides are 0.75 inch×0.75 inch and 0.75 inch×0.5 inch. Although a recess is preferred because it more effectively channels the air into the expansion chamber during start up, the mandrel extension need not have a recess if it has a sufficiently smaller diameter than the mandrel so that the extruded tube material does not contact and adhere to the mandrel extension during start up. The specific mandrel extension dimensions to be selected depends on the melt strength, droop, etc. of the hot melt and other conditions employed. As pointed out above, satisfactory results during startup have been achieved with mandrel extensions having a radius from about ⅛ inch to about ¾ inch shorter than the radius of the mandrel, the shorter radius region extending from about ⅜ inch to about ½ inch axially downstream from the the junction of the mandrel extension and die mandrel. These dimensions are for purposes of illustration and other values outside these ranges may be utilized depending upon the specific materials and other conditions utilized. As previously indicated, the recess in the mandrel extension also serves to diffuse and control the air velocity and permits start up of the extrusion process by preventing the extruded tubular film from adhering to mandrel extension as it initially emerges from the die outlet. The recess also serves to diffuse and reduce the velocity of the incoming air. The recess may be of any suitable cross section such as a "U", a "V", a "W", a "C" lying on its side with the opening facing away from the axis of the mandrel extension, and the like. The sides of the recess need not be perpendicular to the axis of the mandrel extension, but may be at any suitable acute or obtuse angle to the axis, curved, overhanging the air inlet channels, and the like. If the extruded tubular film is extruded in a horizontal direction, a greater number of air passages may optionally be located in the upper half of the mandrel extension than below to counter the effect of gravity on the extruded tubular film. If desired, a plurality of recesses may be utilized along the axial length of the mandrel extension.

The sizing disk may comprise a removable disk or may even be constructed as an integral segment of the mandrel extension. It may comprise any suitable material such as stable metals, ceramics, plastics, composites, and the like. Typical sizing disk materials include stainless steel, aluminum, brass, and the like. The sizing disk preferably includes an insulating hub between the sizing disk and the supporting mandrel extension to thermally insulate the sizing disk from the mandrel extension. Minimizing heat transfer between the mandrel extension to the sizing disk may be accomplished by other suitable means such as reducing the contact area between the mandrel extension and the sizing disk by means of ridges on the mandrel extension and/or sizing disk to maintain an air gap therebetween. The distance between the sizing disk and the die outlet depends upon a number of factors such as the properties of the polymer materials extruded and the temperature of the sizing disk and may be determined experimentally. For example, the distance between the sizing disk and the die outlet decreases with materials having sharp freezing temperatures and reduced melt strength. Rapid cooling to room temperature reduces distortions due to locally distinct cooling rates and relaxation of nonuniform stress induced distortions. Formation of a freeze line closer to the upstream edge of the sizing disk promotes greater positive control over tube dimensions, tolerances and often clarity.

As previously discussed, the upstream corner edge of the sizing disk should preferably have a reasonably sharp angular cross section to prevent snagging or chattering of extruded tubular film. Optionally, the peripheral surface of the sizing disk may be gradually tapered toward the axis of the sizing disk in the downstream direction to compensate for temperature contraction of the extruded tube. The periphery of the sizing disk is preferably roughened slightly to minimize tube chattering. The sizing disk has a diameter larger than the diameter of the mandrel. The larger diameter ensures an adequate seal between the sizing disk perphery and the extruded tube thereby preventing leakage of fluid from the expansion zone past the sizing disk and also markedly reduces the cost of dies for any given product diameter. The ratio of the diameter of the sizing disk to the diameter of the mandrel is also determined by the material properties which normally govern blow-up ratios, and other variables such as temperature, distance of the disk from the die exit, and the like and is, therefore, determined experimentally. Air bleed holes in the sizing disk may be used, if desired, in concert with an air pressure regulator to prevent any excess buildup of static/dynamic air pressure which exceeds a steady state and causes the tube to excessively balloon and exceed the desired tube diameter.

The stabilizing disk may comprise any suitable material such as stable metals, ceramics, plastic, composites, and the like. The stabilizing disk preferably includes an insulating hub between the stabilizing disk and the supporting mandrel extension to thermally insulate the stabilizing from the mandrel extension. There is broad latitude in the distance that may be maintained between the stabilizing disk and the sizing disk. For example, depending upon the materials extruded, satisfactory results have been achieved when the distance between the stabilizing disk and the sizing disk of was between about 3 inches and about two feet. It is believed that distances outside this range may also be suitable. The upstream corner edge of stabilizing disk should preferably have a gradual angular cross section. Since the diameter of the disk is slightly larger than the diameter of the extruded tube, a gradual angular cross section minimizes the formation of powder due to scraping of the stabilizing disk against the extruded tube. Preferably, the diameter of the stabilizing disk is about 0.001 to about 0.010 inch greater than the inside diameter of the tube immediately downstream from the stabilizing disk. The peripheral surface of the stabilizing disk should preferably be level or gradually tapered toward the axis of the sizing disk in the downstream direction. There is considerable latitude in selecting the tube/sizing disk periphery contact distance in the direction of the axis of the sizing disk. Generally, the distance should not be so great that friction precludes the tube from being pulled by the puller. The periphery of the stabilizing disk is preferably roughened slightly to reduce friction. If desired, a plurality of stabilizing disks may be employed and one or more stabilizing disks may be cooled or heated. Generally, an increase in the number of stabilizing disks used results in an increase in the friction that must be overcome in pulling the extruded tubular film over the disks.

The specific properties of the thermoplastic polymer material extruded and the extruded tubular film dimensions desired affect the process control variables selected. For example, various extruder operation conditions will affect the ultimate extruded tubular film produced. These conditions include polymer throughput rate, extruder screw rpm, extruder barrel temperatures, high temperatures, internal cooling air flow rates and the like to enable extrusion of a tube that can be stretched and pulled over the sizing disk. Process control variables for the die include, for example, temperature, air flow rates, vacuum/pressure levels, stretch ratios, post-die cooling, and post-die sizing. When the melt temperature is too high, the melt strength of the polymer may become insufficient for stretching to occur. As a result, the extruded tubular film cannot be pulled over the sizing disk without the tube first collapsing onto the mandrel extension. On the other hand, when the melt temperature is too low, the viscosity of the polymer melt can increase thereby reducing the polymer flow or even causlng freezing of the polymer at the die exit. The extrusion temperature estimate, for example, for polypropylene as the extruded material is 250° C. Accurate control of the temperature attained as well as control of temperature uniformity of the die outlet facilitates regulation of the thickness tolerances and subsequent distortions of the extruded tubular film as the polymer flow rate is dependent on its viscosity which in turn is a strong function of temperature. Normally, the die temperature and die head temperatures are regulated by the same temperature controller such as a Barber Colman controller.

The extruded tubular film process provides considerable flexibility in producing films of various sizes and of various physical and mechanical properties. With respect to film dimensions, the thickness, width, and the like of the extruded film can easily be regulated by varying the blow-up ratio and/or drawdown ratio. The expressions "blow-up ratio" and "drawdown ratio" are defined as follows:

Blow-up ratio=(Inside diameter of tubular film/Inside diameter of die annulus)

Drawdown ratio=(Film velocity at tube puller/Average film velocity at die outlet)

Increasing the blow-up ratio will increase the flat width of the film (i.e. ½ tube circumference), whereas increases in either the blow-up or drawdown ratios will decrease the film thickness for a given die output mass rate.

In general, the cutting of extruded cylinders to a pre-determined length on-line, involves tubes that are at least about 5 inches in diameter for use in preparing electrophotographic imaging members that are capable of handling letter size or larger document images. Moreover, larger diameter cylinders are usually desirable to avoid a minimum radius of curvature which any overstress or deform the photoreceptor when using internal support rollers. Further, still larger diameter cylinders may be necessary if electrical-mechanical components are positioned inside the extruded cylinder such as, for example, a flash lamp.

The system of the present invention utilizes a cost effective die suitable for producing thin-walled, large diameter pliable tubes which meet precise tolerance requirements and which are substantially free of creases or other deformations.

A number of examples are set forth herein below that are illustrative of different materials, apparatus and conditions that can be utilized in practicing the invention. It will also be apparent that the invention can be practiced with many other types of materials, apparatus and conditions and can have many different uses in accordance with the disclosure above and as pointed out hereinafter.

EXAMPLE 1

An extruded tubular film of nylon polymer and pigment particles was prepared utilizing a spiral die. The die had a mandrel diameter of about 4 inches. The die gap was about 0.032 inch and the L/H ratio was approximately 12/1. The mandrel supported a mandrel extension having a maximum diameter of 2 inches and a recess immediately adjacent the mandrel that was ¼ inch wide and ¼ inch deep. The recess contained 8 radial air channels, each having a ¼ inch diameter, uniformly spaced around the periphery of the mandrel extension. Air was fed to the radial air channels through air lines located in the mandrel and mandrel extension. The mandrel extension supported a 7.25 inch diameter sizing disk 3 inches from the mandrel. The flat sizing disk periphery was roughened slightly and had an axial tube contacting distance of 0.437 inch. The upstream corner of the sizing disk had a radius of curvature of 1/32 inch.

The mandrel extension also supported a 7.212 inch diameter, ⅛ inch thick stabilizing disk located 24 inches downstream from the sizing disk. The barrel temperature profile was 205° C., 235° C., 235° C., 225° C., and 220° C. and the die temperature was 215° C. The rpm of the extruder screw was 10 and the die pressure drop was 2,000 psi. The line speed was 3 ft/min. Upon start up, the molten extruded polymer tube was manually pulled over the sizing disk and stabilizing disk while compressed air was introduced through the radial air channels in the mandrel extension recess. The molten polymer did not contact nor adhere to the mandrel extension. The polymer tube was then pulled over the stabilizing disk and over a pair of Teflon disk guide shoes downstream of the stabilizing disk. The disk guide shoes were supported by cantilevered rods secured to the sizing disk. Next, the tube was partially flattened so that it assumed a FIG. 8 cross section and fed into the space between parallel opposing surfaces of a pair of driven neoprene belts bearing a natural gum rubber outer coating. Since the partially flattened extruded tube was wider than the width of the belts, the tube assumed a cross sectional shape resembling a dumbbell or squashed FIG. 8. Each of the Teflon disk guide shoes was positioned inside the substantially circular ends of the dumbbell shaped cross sectional segment. The pressure of the air introduced through the radial air channels in the mandrel extension recess was reduced after the start up process was initiated to prevent rupturing the fully formed melt bubble in the expansion zone and to susequently prevent leakage between the tube and the sizing disk and to achieve steady state condition in the expansion zone. Finally, the tube still having a cross sectional shape resembling a dumbbell or squashed FIG. 8 as it emerged from between the pair of driven neoprene belts was passed through a stationary guilotine cutting station where a horizontally positioned guilotine cutting blade was driven at high speed vertically downward by a 2 inch bore Martonair impact cylinder and retracted to periodically slice the tube at a right angle to the axis of the tube by pressing an activating button. Excellent pliable, thin-walled, seamless cylinders were obtained having only short crease at two diametrically opposite points on each cylinder edge but extending only a about ⅛ inch from the edge axially along the cylinder. The use of this stationary cutting station had no discernible effect on the quality of the tube being formed upstream in the line.

EXAMPLE II

An extruded tubular film of nylon polymer was prepared utilizing a crosshead die. The die had a mandrel diameter of about 2.5 inches. The die gap was about 0.020 inch and the L/H ratio was about 50/1. The mandrel supported a mandrel extension having a diameter of 2 inches and a recess immediately adjacent the mandrel that was 3/16 inch wide and ⅛ inch deep. The recess contained 18 radial air channels, each having a 3/16 inch diameter, uniformly spaced around the periphery of the mandrel extension. Air was fed to the radial air channels through air lines located in the mandrel and mandrel extension. The mandrel extension supported a 7.25 inch diameter sizing disk 2.5 inches from the mandrel. The flat sizing disk periphery was roughened slightly and had an axial tube contacting distance of 0.437 inch. The upstream corner of the sizing disk had a radius of curvature of 1/32 inch. The mandrel extension also supported a 7.212 inch diameter, ⅜ inch thick stabilizing disk located 24 inches downstream from the sizing disk. The barrel temperature profile was 222° C., 228° C., 230° C., 230° C., and 232° C. and the die temperature was 238° C. The rpm of the extruder screw was 13.5 and the die pressure drop was 5,700 psi. The line speed was 5.5 ft/min. Upon start up, the molten extruded polymer tube was manually pulled over the sizing disk and stabilizing disk while compressed air was introduced through the radial air channels in the mandrel extension recess. The molten polymer did not contact nor adhere to the mandrel extension. The polymer tube was then pulled over the stabilizing disk and over a pair of Teflon disk guide shoes downstream of the stabilizing disk. The disk guide shoes were supported by cantilevered rods secured to the sizing disk. Next, the tube was partially flattened so that it assumed a FIG. 8 cross sectionand fed into the space between parallel opposing surfaces of a pair of driven neoprene belts bearing a natural gum rubber outer coating. Since the partially flattened extruded tube was wider than the width of the belts, the tube assumed a cross sectional shape resembling a dumbbell or squashed FIG. 8. Each of the Teflon disk guide shoes was positioned inside the substantially circular ends of the dumbbell shaped cross sectional segment. The pressure of the air introduced through the radial air channels in the mandrel extension recess was reduced after the start up process was initiated to prevent rupturing the fully formed melt bubble in the expansion zone and to susequently prevent leakage between the tube and the sizing disk and to achieve steady state condition in the expansion zone. An excellent pliable, thin-walled, seamless tube was obtained. It is believed that cut cylinders free of creases can be obtained if this tube were thereafter passed through the expansion chamber shown in FIG. 1, 17 and 18 and cut in the travelling cutting apparatus illustrated in FIGS. 1, 19 and 22 in accordance with the hereinabove description thereof. It is also believed that if this cutting station is used, it should have no discernible effect on the quality of the tube being formed upstream in the line.

EXAMPLE III

An extruded tubular film of nylon polymer was prepared utilizing a crosshead die. The die had a mandrel diameter of about 6 inches. The die gap was about 0.012 inch and the L/H ratio was about 100/1. The mandrel supported a mandrel extension having a diameter of 3 inches and a recess immediately adjacent the mandrel that was ¼ inch wide and ⅜ inch deep. The recess contained 56 radial air channels, each having a ¼ inch diameter, uniformly spaced around the periphery of the mandrel extension. Air was fed to the radial channels through air lines located in the mandrel and mandrel extension. The mandrel extension supported a 7.5 inch diameter sizing disk 3 inches from the mandrel. The flat sizing disk periphery was roughened slightly and had an axial tube contacting distance of 0.437 inch. The upstream corner of the sizing disk had a radius of curvature of 1/32 inch. The mandrel extension also supported a 7.212 inch diameter, ⅜ inch thick stabilizing disk located 24 inches downstream from the sizing disk. The barrel temperature profile was 222° C., 226° C., 226° C., 226° C., and 237° C. and the die temperature was 237° C. The rpm of the extruder screw was 8 and the die pressure drop was 7,000 psi. The line speed was 2 ft/min. Upon start up, the molten extruded polymer tube was manually pulled over the sizing disk and stabilizing disk while compressed air was introduced through the radial air channels in the mandrel extension recess. The molten polymer did not contact nor adhere to the mandrel extension. The polymer tube was then pulled over the stabilizing disk and over a pair of Teflon disk guide shoes downstream of the stabilizing disk. The disk guide shoes were supported by cantilevered rods secured to the sizing disk. Next, the tube was partially flattened so that it assumed a FIG. 8 cross sectionand fed into the space between parallel opposing surfaces of a pair of driven neoprene belts bearing a natural gum rubber outer coating. Since the partially flattened extruded tube was wider than the width of the belts, the tube assumed a cross sectional shape resembling a dumbbell or squashed FIG. 8. Each of the Teflon disk guide shoes was positioned inside the substantially circular ends of the dumbbell shaped cross sectional segment. The pressure of the air introduced through the radial air channels in the mandrel extension recess was reduced after the start up recess was initiated to prevent rupturing the fully formed melt bubble in the expansion zone and to susequently prevent leakage between the tube and the sizing disk and to achieve steady state condition in the expansion zone. An excellent pliable, thin-walled, 4.3 mil thick, seamless tube was obtained. An excellent pliable, thin-walled, seamless tube was obtained. It is believed that cut cylinders free of creases can be obtained if the this tube were cut in the apparatus illustrated in FIG. 23 in accordance with the hereinabove description thereof. It is also believed that the use of this cutting station should have no discernible effect on the quality of the tube being formed upstream in the line.

EXAMPLE IV

An extruded tubular film of nylon polymer was prepared utilizing a crosshead die. The die had a mandrel diameter of about 6 inches. The die gap was about 0.020 inch and the L/H ratio was about 60/1. The mandrel supported a mandrel extension having a diameter of 3 inches and a recess immediately adjacent the mandrel that was ¼ inch wide and ⅜ inch deep. The recess contained 56 radial air channels, each having a ¼ inch diameter, uniformly spaced around the periphery of the mandrel extension. Air was fed to the radial air channels through air lines located in the mandrel and mandrel extension. The mandrel extension supported a 10.763 inch diameter sizing disk 2.5 inches from the mandrel. The flat sizing disk periphery was roughened slightly and had an axial tube contacting distance of 0.437 inch. The upstream corner of the sizing disk had a radius of curvature of 1/32 inch. The mandrel extension also supported a 10.724 inch diameter, ⅜ inch thick stabilizing disk located 24 inches downstream from the sizing disk. The barrel temperature profile was 230° C., 270° C., 260° C., 255° C., and 250° C. and the die temperature was 245° C. The rpm of the extruder screw was 15 and the die pressure drop was 5,450 psi. The line speed was 3 ft/min. Upon start up, the molten extruded polymer tube was manually pulled over the sizing disk and stabilizing disk while compressed air was introduced through the radial air channels in the mandrel extension recess. The molten polymer did not contact nor adhere to the mandrel extension. The polymer tube was then pulled over the stabilizing disk and over a pair of Teflon disk guide shoes downstream of the stabilizing disk. The disk guide shoes were supported by cantilevered rods secured to the sizing disk. Next, the tube was partially flattened so that it assumed a FIG. 8 cross section and fed into the space between parallel opposing surfaces of a pair of driven neoprene belts bearing a natural gum rubber outer coating. Since the partially flattened extruded tube was wider than the width of the belts, the tube assumed a cross sectional shape resembling a dumbbell or squashed FIG. 8. Each of the Teflon disk guide shoes was positioned inside the substantially circular ends of the dumbbell shaped cross sectional segment. The pressure of the air introduced through the radial air channels in the mandrel extension recess was reduced after the start up process was initiated to prevent rupturing the fully formed melt bubble in the expansion zone and to susequently prevent leakage between the tube and the sizing disk and to achieve steady state condition in the expansion zone. An excellent pliable, thin-walled, 4.9 mil thick, seamless tube was obtained. An excellent pliable, thin-walled, seamless tube was obtained. It is believed that cut cylinders substantially free of creases can be obtained if the this tube were cut in the apparatus illustrated in FIGS. 24, 25 and 26 in accordance with the hereinabove description thereof. It is also believed that if this cutting station is used, it should have no discernible effect on the quality of the tube being formed upstream in the line.

EXAMPLE V

An extruded tubular film of nylon polymer and pigment particles was prepared utilizing a spiral die. The die had a mandrel diameter of about 3 inches. The die gap was about 0.032 inch and the L/H ratio was approximately 12/1. The mandrel supported a mandrel extension having a maximum diameter of 2 inches and a recess immediately adjacent the mandrel that was $\frac{1}{4}$ inch wide and $\frac{1}{4}$ inch deep. The recess contained 8 radial air channels, each having a $\frac{1}{4}$ inch diameter, uniformly spaced around the periphery of the mandrel extension. Air was fed to the radial air channels through air lines located in the mandrel and mandrel extension. The mandrel extension supported a 10.689 inch diameter sizing disk 3 inches from the mandrel. The flat sizing disk periphery was roughened slightly and had an axial tube contacting distance of 0.437 inch. The upstream corner of the sizing disk had a radius of curvature of 1/32 inch. The mandrel extension also supported a 10.724 inch diameter, $\frac{3}{8}$ inch thick stabilizing disk located 24 inches downstream from the sizing disk. The barrel temperature profile was 225° C., 255° C., 255° C., 245° C., and 240° C. and the die temperature was 225° C. The rpm of the extruder screw was 14 and the die pressure drop was 2,250 psi. The line speed was 4 ft/min. Upon start up, the molten extruded polymer tube was manually pulled over the sizing disk and stabilizing disk while compressed air was introduced through the radial air channels in the mandrel extension recess. The molten polymer did not contact nor adhere to the mandrel extension. The polymer tube was then pulled over the stabilizing disk and over a pair of Teflon disk guide shoes downstream of the stabilizing disk. The disk guide shoes were supported by cantilevered rods secured to the sizing disk. Next, the tube was partially flattened so that it assumed a FIG. 8 cross section and fed into the space between parallel opposing surfaces of a pair of driven neoprene belts bearing a natural gum rubber outer coating. Since the partially flattened extruded tube was wider than the width of the belts, the tube assumed a cross sectional shape resembling a dumbbell or squashed FIG. 8. Each of the Teflon disk guide shoes was positioned inside the substantially circular ends of the dumbbell shaped cross sectional segment. The pressure of the air introduced through the radial air channels in the mandrel extension recess was reduced after the start up process was initiated to prevent rupturing the fully formed melt bubble in the expansion zone and to susequently prevent leakage between the tube and the sizing disk and to achieve steady state condition in the expansion zone. An excellent pliable, thin-walled, seamless tube was obtained. An excellent pliable, thin-walled, seamless tube was obtained. It is believed that cut cylinders free of creases can be obtained if this tube were thereafter passed through the expansion chamber shown in FIGS. 1, 17 and 18 and cut in the travelling cutting apparatus illustrated in FIGS. 1, 19 and 22 in accordance with the hereinabove description thereof. It is also believed that if this cutting station is used, it should have no discernible effect on the quality of the tube being formed upstream in the line.

EXAMPLE VI

An extruded tubular film of polyethylene terephthalate glycol copolyester was prepared utilizing a spiral die. The die had a mandrel diameter of about 4 inches. The die gap was about 0.032 inch and the L/H ratio was approximately 12/1. The mandrel supported a mandrel extension having a maximum diameter of 2 inches and a recess immediately adjacent the mandrel that was $\frac{1}{4}$ inch wide and $\frac{1}{4}$ inch deep. The recess contained 8 radial air channels, each having a $\frac{1}{4}$ inch diameter, uniformly spaced around the periphery of the mandrel extension. Air was fed to the radial air channels through air lines located in the mandrel and mandrel extension. The mandrel extension supported a 13.077 inch diameter sizing disk 2.5 inches from the mandrel. The flat sizing disk periphery was roughened slightly and had an axial tube contacting distance of 0.437 inch. The upstream corner of the sizing disk had a radius of curvature of 1/32 inch. The mandrel extension also supported a 13.038 inch diameter, $\frac{3}{8}$ inch thick stabilizing disk located 24 inches downstream from the sizing disk. The barrel temperature profile was 215° C., 229° C., 229° C., 222° C., and 217° C. and the die temperature was 214° C. The rpm of the extruder screw was 19 and the die pressure drop was 1,350 psi. The line speed was 3 ft/min. Upon start up, the molten extruded polymer tube was manually pulled over the sizing disk and stabilizing disk while compressed air was introduced through the radial air channels in the mandrel extension recess. The molten polymer did not contact nor adhere to the mandrel extension. The polymer tube was then pulled over the stabilizing disk and over a pair of Teflon disk guide shoes downstream of the stabilizing disk. The disk guide shoes were supported by cantilevered rods secured to the sizing disk. Finally, the tube was partially flattened so that it assumed a FIG. 8 cross section and fed into the space between parallel opposing surfaces of a pair of driven neoprene belts bearing a natural gum rubber outer coating. Since the partially flattened extruded tube was wider than the width of the belts, the tube assumed a cross sectional shape resembling a dumbbell or squashed FIG. 8. Each of the Teflon disk guide shoes was positioned inside the substantially circular ends of the dumbbell shaped cross sectional segment. The pressure of the air introduced through the radial air channels in the mandrel extension recess was reduced after the start up process was initiated to prevent rupturing the fully formed melt bubble in the expansion zone and to susequently prevent leakage between the tube and the sizing disk and to achieve steady state condition in the expansion zone. An excellent pliable, thin-walled, seamless tube was obtained. It is believed that cut cylinders free of creases can be obtained if this tube were thereafter passed through the expansion chamber shown in FIGS. 1, 17 and 18 and cut in the travelling cutting apparatus illustrated in FIGS. 1, 19 and 22 in accordance with the hereinabove description thereof. It is also believed that if this cutting station is used, it should have no discernible effect on the quality of the tube being formed upstream in the line.

Although processes and apparatus have been discussed in terms of a horizontal extrusion line, a vertical extrusion line is also contemplated as an embodiment this invention. Such a system would simplify certain design problems relating to gravity and associated asymmetry of forces. Also, the formation of right cylinders have been described only for purposes of illustration. Other end shapes may be formed by merely altering the speed of travel of the cutter relative to the moving tube to obtain, for example, tube ends that are not parallel to each other or tube ends that are parallel to each other but oblique to the tube axis. Further, although certain specific arrangements of die, sizing disk and stabilizing disk have been described to prepare a thin seamless flexible tube to be processed with the apparatus and process of this invention, any other suitable die arrangement combination with cutters disclosed herein may be utilized in this invention to prepare thin seamless, pliable, creasless cylinders.

The invention has been described in detail with particular reference to preferred embodiments thereof but it will be understood that variations and modifications can be effected within the spirit and scope of the invention as described herein above and as defined in the appended claims.

I claim:

1. A process for preparing seamless, creaseless, pliable, thin-walled tubes comprising extruding a continuous moving tube of polymeric film material from a die into the ambient atmosphere, radially stretching said continuous tube over a sizing disk as said polymeric film material emerges from said die, maintaining a pillow of pressurizing air within said tube in the region between said die and said sizing disk, longitudinally stretching said tube, maintaining the downstream free end of said tube open to the ambient atmosphere and free of creases, and severing said tube while maintaining the cross-sectional shape of said tube free of creases and while said tube is in motion thereby forming at least one tube segment having a right cylinder configuration substantially free of creases.

2. A process for preparing seamless, creaseless, pliable, thin-walled tubes according to claim 1 including severing said tube from the outside surface of said tube while maintaining the cylindrical configuration of said tube.

3. A process for preparing seamless, creaseless, pliable, thin-walled tubes according to claim 1 including severing said tube from the inside surface of said tube while maintaining the cylindrical configuration of said tube.

4. A process for preparing seamless, creaseless, pliable, thin-walled tubes according to claim 1 including drawing said tube over a stabilizing disk downstream of said sizing disk and maintaining a zone of pressurized air within said tube in the region between said sizing disk and said stabilizing disk.

5. Apparatus for preparing seamless, creaseless, pliable, thin-walled tubes comprising means to extrude a moving continuous tube of molten polymeric film material from a die into the ambient atmosphere, means to radially stretch said continuous tube as it emerges from said die, a disc shaped sizing means supported by said die, said disc shaped sizing means having a continuous outer circumferential periphery adapted to contact the interior of said tube and form an air pillow in cooperation with said tube and said die, means to introduce a fluid under pressure through said die into said air pillow, and means to longitudinally stretch said tube while maintaining the downstream free end of said tube open to the ambient atmosphere and free of creases, and means to sever said tube while said tube is in motion to form tube segments while maintaining said tube substantially free of creases.

6. Apparatus for preparing seamless, creaseless, pliable, thin-walled tubes according to claim 5 wherein said means to longitudinally stretch said tube comprises a pair of belts arranged on opposite sides of said tube to compress the middle region of said tube along the axis of said tube until the opposite inner surfaces of said tube are in close proximity to each other to form a belt cross section having a squashed FIG. 8 shape.

7. Apparatus for preparing seamless, creaseless, pliable, thin-walled tubes according to claim 5 wherein said means to sever said tube comprises a severing means capable of traversing a spiral path around the path of said tube while said tube is in motion to form tube segments having a right cylinder configuration.

8. Apparatus for preparing seamless, creaseless, pliable, thin-walled tubes according to claim 5 including at least a split cylindrical vacuum shoe means to conform to and firmly grip the outside surface of said tube and a cutting means adjacent said split cylindrical vacuum shoe means capable of circumferentially cutting the outside surface of said tube while said tube is gripped by said cylindrical vacuum shoe means and while said tube is in motion.

9. Apparatus for preparing seamless, creaseless, pliable, thin-walled tubes according to claim 8 including a split cylindrical vacuum shoe means on the upstream side said cutting means and a split cylindrical vacuum shoe means on the downstream side of said cutting means, each of said split cylindrical vacuum shoe means adapted to conform to and firmly grip the outside surface of said tube while said tube is in motion.

10. Apparatus for preparing seamless, creaseless, pliable, thin-walled tubes according to claim 5 including means to expand said tube from the inside of said tube and a cutting means inside of said tube adapted to circumferentially cut said tube while said tube is expanded and while said tube is in motion.

11. Apparatus for preparing seamless, creaseless, pliable, thin-walled tubes according to claim 5 including a stationary expansion vacuum floatation ring to expand said tube from the outside of said tube and a cutting means adapted to travel with said moving tube and circumferentially sever said tube while said tube is expanded.

12. Apparatus for preparing seamless, creaseless, pliable, thin-walled tubes according to claim 5 including means to extend said means to sever said tube for engagement with said tube and to retract said means to sever said tube for disengagement with said tube.

13. Apparatus for preparing seamless, creaseless, pliable, thin-walled tubes according to claim 5 including a disc shaped stabilizing means supported by said sizing disk, said disc shaped stabilizing means having a continuous outer circumferential periphery adapted to contact the interior of said tube and form a fluid pressure zone in cooperation with said tube and said sizing disk and means to introduce a fluid under pressure through said die and said sizing disk into said fluid pressure zone.

* * * * *